US011335508B2

(12) United States Patent
Ando et al.

(10) Patent No.: US 11,335,508 B2
(45) Date of Patent: May 17, 2022

(54) ELECTRONIC DEVICE

(71) Applicant: TDK CORPORATION, Tokyo (JP)

(72) Inventors: Norihisa Ando, Tokyo (JP); Shinya Ito, Tokyo (JP); Kosuke Yazawa, Tokyo (JP); Akihiro Masuda, Tokyo (JP); Yoshiki Satou, Tokyo (JP); Katsumi Kobayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 6 days.

(21) Appl. No.: 16/725,374

(22) Filed: Dec. 23, 2019

(65) Prior Publication Data

US 2020/0203076 A1     Jun. 25, 2020

(30) Foreign Application Priority Data

Dec. 25, 2018  (JP) .............................. JP2018-240881
Mar. 15, 2019  (JP) .............................. JP2019-048927

(51) Int. Cl.
  *H01G 4/30*   (2006.01)
  *H01G 4/005*  (2006.01)
  *H01G 4/224*  (2006.01)
  *H01G 4/248*  (2006.01)
  *H01G 4/38*   (2006.01)

(52) U.S. Cl.
  CPC .............. *H01G 4/30* (2013.01); *H01G 4/005* (2013.01); *H01G 4/224* (2013.01); *H01G 4/248* (2013.01); *H01G 4/38* (2013.01)

(58) Field of Classification Search
  CPC .......... H01G 4/30; H01G 4/005; H01G 4/224; H01G 4/228; H01G 4/248; H01G 4/38

USPC ............ 361/321.1, 321.2, 321.3, 301.4, 328, 361/301.3, 306.3
  See application file for complete search history.

(56) References Cited

U.S. PATENT DOCUMENTS

| 5,548,473 | A  | * | 8/1996  | Wang ..................... H01G 4/224 361/519 |
| 2016/0260546 | A1 | * | 9/2016  | Mori ........................ H01G 4/12 |
| 2018/0286584 | A1 | * | 10/2018 | Ando .................... H01G 4/1227 |
| 2019/0180943 | A1 | * | 6/2019  | Togawa ................ H01L 41/053 |

FOREIGN PATENT DOCUMENTS

| JP | 2758946 B2 | 5/1998 |
| JP | H11-102837 A | 4/1999 |
| JP | 2000228327 A | * | 8/2000 |
| JP | 3687832 B2 | 8/2005 |
| JP | 2011040684 A | * | 2/2011 |
| KR | 10-2010-0106006 A | 10/2010 |

* cited by examiner

*Primary Examiner* — Arun Ramaswamy
(74) *Attorney, Agent, or Firm* — Oliff PLC

(57) ABSTRACT

An electronic device including chip components each having a first terminal electrode and a second terminal electrode formed on both end faces, and a case provided with an accommodation recess in which the chip components are accommodated, and an opening edge face formed around an opening face of the accommodation recess. An individual metal terminal is attached to the case. The individual metal terminal includes an inner electrode part inserted along an inner side wall of the accommodation recess in the case for connecting to the first terminal electrode, an opening edge electrode part formed over the opening edge face to be continuous to the inner electrode part and a side electrode part formed along the outer side face of the case to be continuous to the opening edge electrode part.

25 Claims, 27 Drawing Sheets

ELECTRONIC DEVICE

TECHNICAL FIELD

The invention relates to an electronic device having a case in which a chip component such as a multilayer ceramic capacitor is accommodated.

BACKGROUND

As an electronic device such as a multilayer ceramic capacitor, in addition to a general chip component that is directly mounted on such as a substrate by itself, an electronic device in which a metal made cap (a metal terminal) is attached to chip components as shown in Patent Document 1 is exemplified.

Electronic devices to which metal terminals are attached, after the mounting, are reported to have the effect of reducing the deformation stress that the chip components receives from the substrate, and protecting the chip components from impact, etc. And thus, the devices are used in the fields that require durability and reliability.

However, in the conventional electronic device, the operation for connecting the chip components to the metal terminals at the same time is not easy.

Patent Document 1: Japanese unexamined patent application No. H11-102837

SUMMARY

The invention has been made in view of such situations, and an object thereof is to provide an electronic device capable of extremely easily connecting chip components to a conductive terminal such as a metal terminal.

In order to achieve the above object, an electronic device according to the first aspect of the invention includes:

an electronic device including;

chip components each having a first terminal electrode and a second terminal electrode formed on both end faces, a case provided with an accommodation recess in which the chip components are accommodated, and an opening edge face formed around an opening face of the accommodation recess, and an individual conductive terminal including an inner electrode part inserted along an inner side wall of the accommodation recess in the case for connecting to the first terminal electrode, an opening edge electrode part formed over the opening edge face to be continuous to the inner electrode part, and a side electrode part formed along the outer side face of the case to be continuous to the opening edge electrode part.

When assembling the electronic device of the invention, the inner electrode part of the individual conductive terminal can be connected to the first terminal electrode of the chip component only by accommodating the chip components in the accommodation part through the opening provided on only one face of the case. Further, by connecting the inner connecting part of the individual conductive terminals for each terminal electrode of the chip component, it is possible to easily realize the parallel connection or series connection of the chip component.

Furthermore, in the electronic device according to the invention, since the chip component is accommodated inside the accommodation recess of the case, the chip component is protected by the case, and the reliability of the electronic device is improved. In addition, since the opening edge electrode part and the side electrode part of the individual conductive terminal are drawn out of the case, it is not necessary to provide a through hole or the like on the wall face configuring the accommodation recess of the case. Therefore, the accommodation recess of the case can also be used as a resin filling space.

Moreover, the opening edge electrode part or side electrode part exposed outside of the case can be used as an electrode surface for mounting. In particular, by using the side electrode part as an electrode surface for mounting, it is possible to improve the fixing strength of the electronic device to the circuit board (external circuit). Further, by forming a gap or the like between the side electrode part and the side wall outer face of the case, it becomes easy to suppress such as the resonance of the electronic device.

In addition, since the opening edge electrode part and the side electrode part of the individual conductive terminal are drawn out of the case, the individual conductive terminals of the electronic devices can be mutually connected by overlapping the cases of the electronic devices. Furthermore, the individual conductive terminal of different cases can be mutually connected by placing the cases of the electronic devices side by side. That is, the degree of freedom for mounting the electronic devices is also improved. Further, the electronic device of the invention is relatively compact.

The individual conductive terminal of the present electronic device may further include an anti-opening electrode part, formed to be continuous to the side electrode part on an anti-opening surface located on the opposite side of the opening edge face. With this configuration, the anti-opening electrode part of the individual conductive terminal can be used as the mounting surface on a circuit board or the like. In addition, by arranging the electronic devices of the invention in an overlapping manner, it is easy to connect the individual conductive terminals.

The inner electrode part may include a curved part pressed against the first terminal electrode by a spring force. With this configuration, the inner side electrode part and the first terminal electrode are connected in a press-contact state, and it becomes unnecessary to connect these with connection members, such as solder, a conductive adhesive, etc. The terminal and the electrode can be connected without using solder, copper, a copper alloy, or the like can be used as a material for the terminal. Thus, ESR (equivalent series resistance) can be reduced. Further, since no solder is used, the possibility of cracking the chip component due to a difference in thermal expansion can be reduced.

The through hole may be formed on the inner electrode part close to the opening edge face side along the width direction. By forming the through hole, solder wicking toward the inner electrode part can be prevented, when the opening edge electrode part or the side electrode part is connected to the circuit board or the like by solder. That is, so-called solder bridge can be effectively prevented.

An engagement piece may be formed on the inner electrode part close to the opening edge face side projecting outward along the width direction, and an engagement convex engaging the engagement piece may be formed on the opening edge face. With this configuration, the engagement piece engages with the engagement convex part in a one-touch manner and a positioning of terminals and a firm fixing with respect to the case can be performed easily by simply inserting the inner electrode part of the individual conductive terminal into the case.

A surface of the inner electrode part may be subjected to a solder adhesion preventing process. With this process, so-called solder bridges can be effectively prevented.

The accommodation recess may is provided with a partition wall that partitions the adjacent chip components. Since the partition wall is formed, the chip components can be easily attached, and the adjacent chip components can be easily insulated.

The electronic device of the invention may further include a common conductive terminal having the inner electrode part inserted along the inner side wall of the accommodation recess in the case to connect the second terminal electrodes of the adjacent chip components inside the accommodation recess. With this configuration, series connection of the chip components inside the case becomes easy.

The common conductive terminal may further include the opening edge electrode part formed over the opening edge face to be continuous to the inner electrode part and the side electrode part formed along the outer side face of the case to be continuous to the opening edge electrode part. With this configuration, it becomes easy to connect the common conductive terminal to a circuit board or the like.

Further, by connecting the common conductive terminal to such as the circuit board, the mounting strength between the electronic device and the circuit board can be improved, and resonance can also be prevented. When the mounted common conductive terminal is connected to an external circuit pattern, a two-parallel capacitor circuit can be configured. On the other hand, when the mounted common conductive terminal is not connected to the external circuit pattern (in the case of a floating pattern), a two-series capacitor circuit can be configured.

The electronic device of the invention may further include an anti-opening electrode part formed to be continuous to the side electrode part on an anti-opening surface located on the opposite side of the opening edge face. It is also possible to use the anti-opening electrode part as an electrode face for mounting.

The inner electrode part may include a curved part pressed against the second terminal electrode by the spring force. The connection between the common conductive terminal and the second terminal electrode becomes easy without using solder or the like.

The accommodation recess may be provided with a partition wall that partitions the adjacent chip components, and a connecting groove connecting the inner electrode part of the common conductive terminal may be formed in the partition wall. The common conductive terminal makes it possible to connect the second terminal electrodes of adjacent chip components through the connecting groove.

In order to achieve the above object, an electronic device according to a second aspect of the invention includes:

chip components each having terminal electrodes formed on both end faces, a case provided with an accommodation recess in which the chip components are accommodated, and an opening edge face formed around an opening face of the accommodation recess, and a pair of individual conductive terminals disposed opposite to each other, in which at least one of the individual conductive terminals comprises an inner electrode part inserted along an inner side wall of the accommodation recess in the case for connecting to the first terminal electrode, an opening edge electrode part formed over the opening edge face to be continuous to the inner electrode part, and a side electrode part formed along the outer side face of the case to be continuous to the opening edge electrode part, and the chip components are arranged with their end faces facing each other between each of the pair of individual conductive terminals.

The electronic device of the invention has a pair of individual conductive terminals arranged to face each other, and the chip components arranged with their end faces facing each other between each of the pair of individual conductive terminals. Therefore, the chip components can be arranged in series inside the accommodation recess. And the electronic device having the chip components connected in series can be configured by connecting terminal electrodes of each chip component.

The electronic device of the invention preferably includes an intermediate connector connecting the terminal electrodes of the adjacent chip components. With this configuration, the terminal electrodes of each adjacent chip component can be easily connected through the intermediate connector.

DETAILED EMBODIMENTS

Hereinafter, the invention will be described based on the embodiments shown in Figures.

First Embodiment

Figure 1:
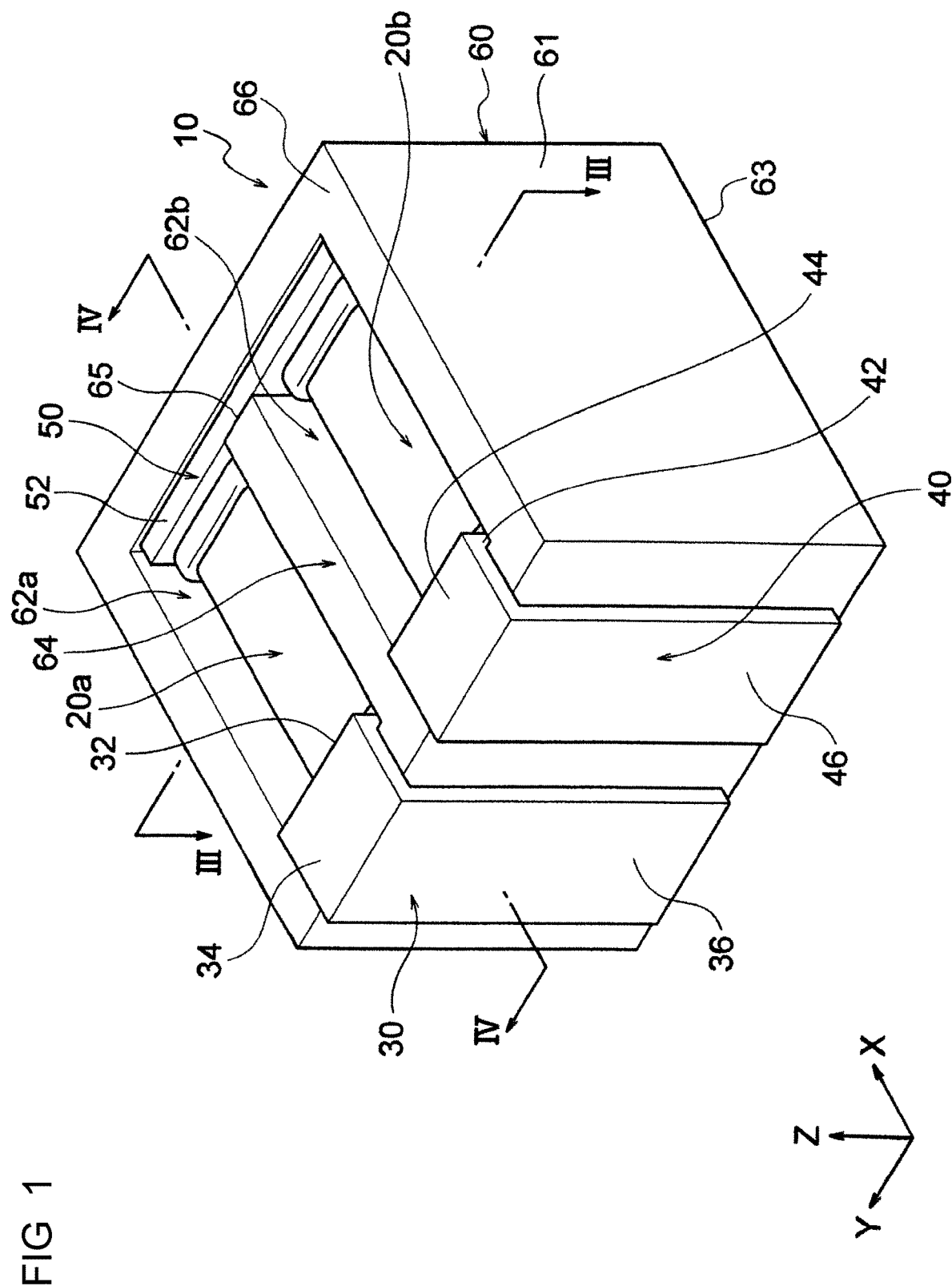
FIG. 1 is a schematic perspective view of the electronic device according to an embodiment of the invention.
Figure 2A:
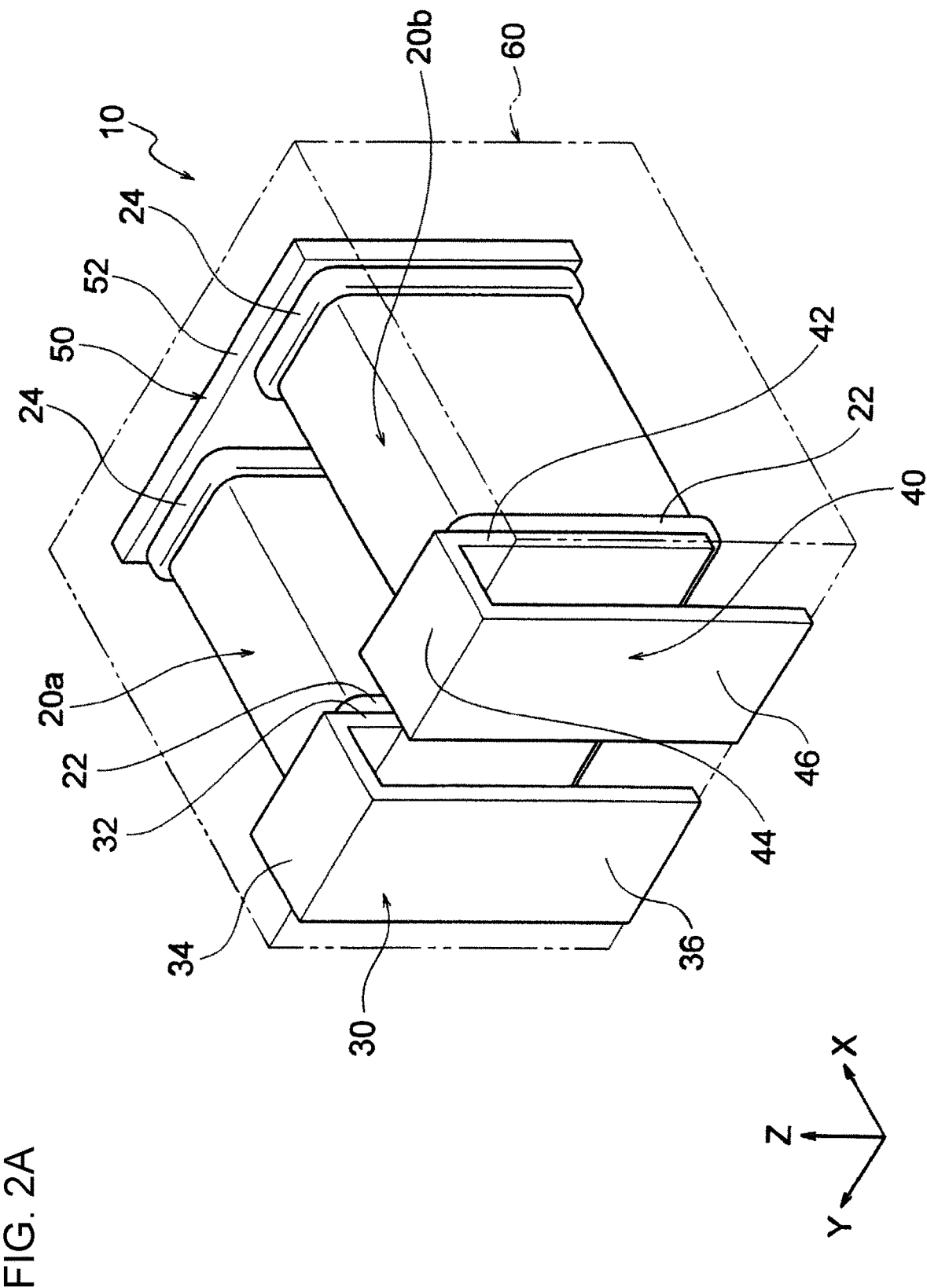
FIG. 2A is a schematic perspective view of the electronic device of FIG. 1 showing inside by the transparent case.

As shown in FIGS. 1 and 2A, the electronic device 10 according to the first embodiment of the invention includes two capacitor chips (chip components) 20a and 20b, a pair of individual metal terminals 30 and 40, a common metal terminal 50, and an insulating case 60. Note that the individual metal terminals 30 and 40 and the common metal terminal 50 may be formed of conductive terminals made of a conductive material other than metal.

Figure 3:
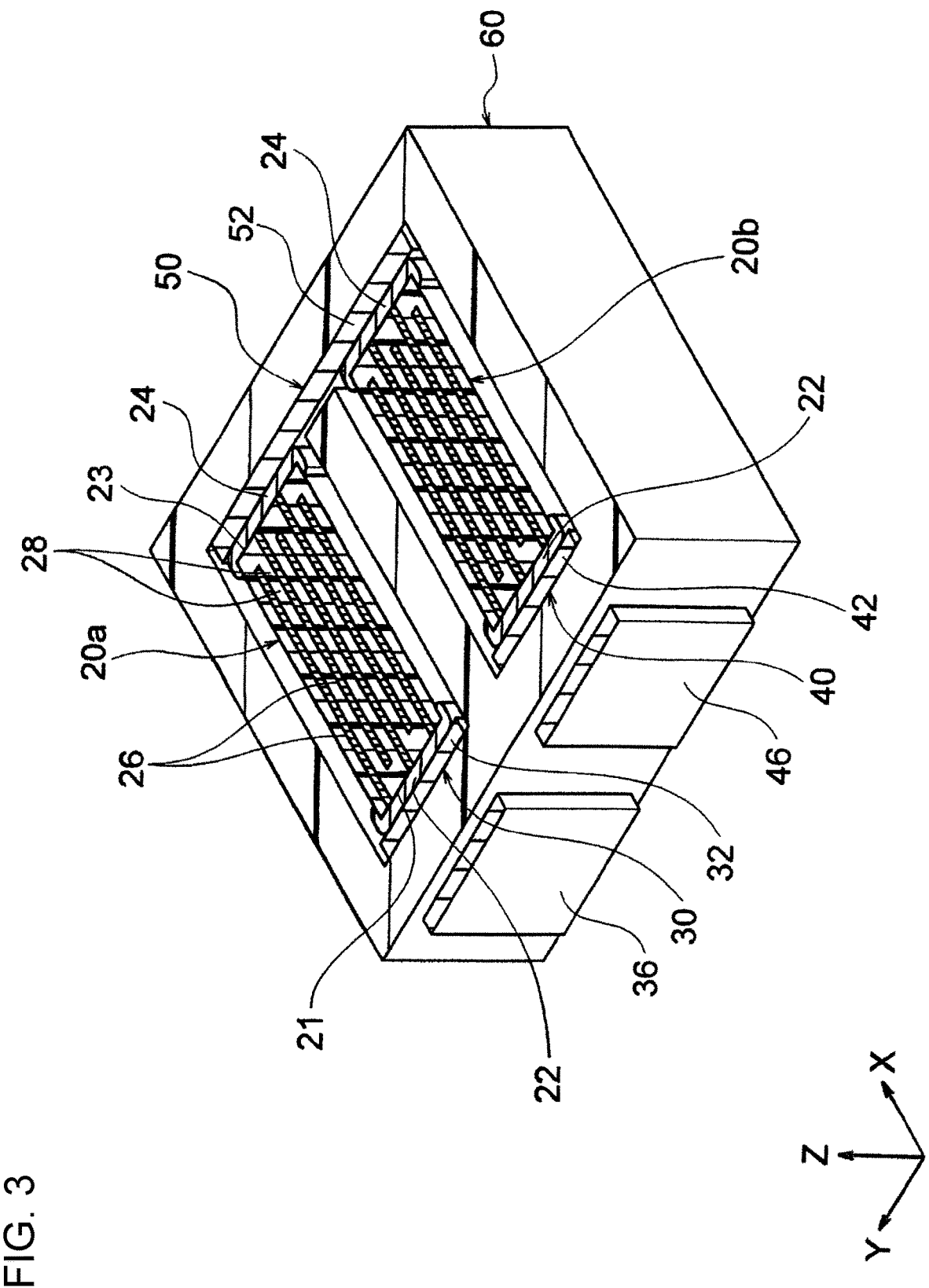
FIG. 3 is a cross-sectional view of the electronic device along the line shown in FIG. 1.

As shown in FIG. 2A, each of the capacitor chips 20a and 20b has a substantially rectangular parallelepiped shape and has substantially the same shape and size. As shown in FIG. 3, each of the capacitor chips 20a and 20b has an element body in which internal electrode layers 26 and dielectric layers 28 are laminated along the Y-axis direction. The first and the second terminal electrodes 22 and 24 are respectively formed on the first and second end faces 21 and 23 that face each other in the X-axis direction of the element body and are connected to one of the internal electrode layers 26 adjacent in the laminated direction.

The material of the dielectric layer 28 in the capacitor chips 20a and 20b is not particularly limited and is made of a dielectric material such as calcium titanate, strontium titanate, barium titanate, or a mixture thereof. The thickness of each dielectric layer 28 is not particularly limited but is generally 1 µm to several hundreds µm. According to the embodiment, the thickness of each dielectric layer 28 is preferably 1.0 to 5.0 µm.

The conductor material contained in the internal electrode layer 26 is not particularly limited, but a relatively inexpensive base metal can be used when a material of the dielectric layer 28 has reduction resistance. As the base metal, Ni or Ni alloy is preferable. The Ni alloy is preferably an alloy of Ni and one or more elements selected from Mn, Cr, Co and Al, and the Ni content in the alloy is preferably 95 wt % or more. In addition, various trace components, such as P, may be contained in Ni or Ni alloy for approximately 0.1 wt % or less. The internal electrode layer 26 may be formed using a commercially available electrode paste. The thickness of the internal electrode layer 26 is suitably determined according to such as its use.

The material of the first and second terminal electrodes 22 and 24 is also not particularly limited, but copper, copper alloy, nickel, nickel alloy, etc. is generally used, and silver, a silver-palladium alloy, etc. can also be used. The thickness of the terminal electrodes 22 and 24 is also not particularly limited, but it is usually approximately 10 to 50 µm. Note that at least one type of metal coat selected from Ni, Cu, Sn, etc. may be formed on the surfaces of the first and second terminal electrodes 22, 24.

The shape and size of the capacitor chips 20a and 20b may be suitably determined according to the purpose and the application. Capacitor chips 20a and 20b are, for example, vertical (the X-axis dimension shown in FIG. 2A): 1.0 to 6.5 mm×horizontal (the Z-axis dimension shown in FIG. 2A): 0.5 to 5.5 mm×thickness (the Z-axis dimension shown in FIG. 2A): 0.3 to 3.5 mm. Each of the capacitor chips 20a and 20b may have different sizes and shapes. In figures, the X-axis, the Y-axis, and the Z-axis are perpendicular to each other.

Figure 2B:
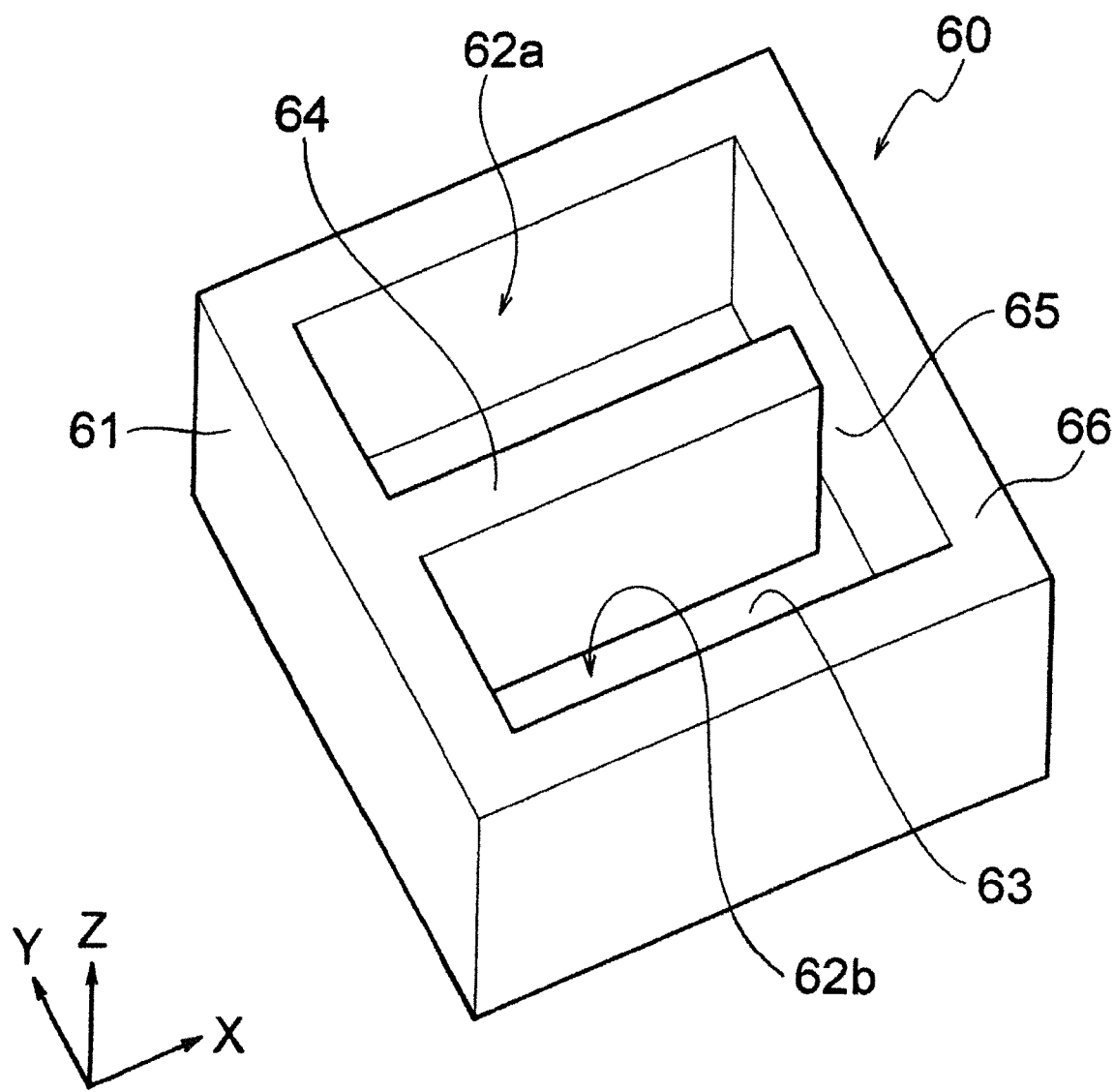
FIG. 2B is a schematic perspective view of the case shown in FIG. 1 viewed from a different angle.

As shown in FIG. 1 and FIG. 2B, according to the embodiment, the insulating case 60 is configured by a rectangular parallelepiped housing and has an outer wall 61 and a bottom wall 63, surrounding accommodation recesses 62a and 62b that open upward along the Z axis. The accommodation recesses 62a and 62b adjacent to each other in the Y-axis direction are mostly partitioned by the partition wall 64, but mutually communicated by a connecting groove 65 provided in the partition wall 64.

The connecting groove 65 is formed along one side of the inner wall face in the X-axis direction in each of the accommodation recesses 62a and 62b. Through the connecting groove 65, the inner electrode part 52 of the common metal terminal 50 is attached inside of the accommodation recesses 62a and 62b along the inner wall face to bridge the accommodation recesses 62a and 62b.

According to the embodiment, the width of the connecting groove 65 in the X-axis direction is a width that the inner electrode part 52 of the common metal terminal 50 can be inserted and fixed. Further, the depth of the connecting groove 65 in the Z-axis direction is approximately the same as the depth of each accommodation recess 62a, 62b in the Z-axis direction. According to the embodiment, the common metal terminal 50 is configured by only the inner electrode part 52 inserted into the accommodation recesses 62a and 62b through the connecting groove 65, and the inner electrode part 52 is configured by a rectangular flat plate. As shown in FIG. 2A, the inner electrode part 52 is in contact with and electrically connected to the second terminal electrodes 24, 24 of both capacitor chips 20a, 20b.

As shown in FIG. 2B, according to the embodiment, the opening faces of the accommodation recesses 62a and 62b of the insulating case 60 are only placed on the upper faces in the Z-axis direction. And the outer wall 61 and the bottom wall 63 of the accommodation recesses 62a and 62b are not formed with any hole, notch, groove, or opening communicating with the outside of the case 60. Around the opening faces of the accommodation recesses 62a and 62b of the insulating case 60, the case 60 has an opening edge face 66 on the upper face of the outer wall 61 in the Z-axis direction. According to the embodiment, the opening edge face 66 is flush with the upper face of the partition wall 64 in the Z-axis direction, but it may be different.

As shown in FIGS. 1 and 2A, the first individual metal terminal 30 has an inner electrode part 32 that is inserted along the other inner wall in the X-axis direction of one accommodation recess 62a in the insulating case 60. Inner electrode 32, as shown in FIG. 3, is electrically connected and in contact with the first terminal electrode 22 of one capacitor chip 20a in the Y-axis direction. An opening edge electrode part 34 is formed over the opening edge face 66 to be continuous to the inner electrode part 32.

Figure 4:
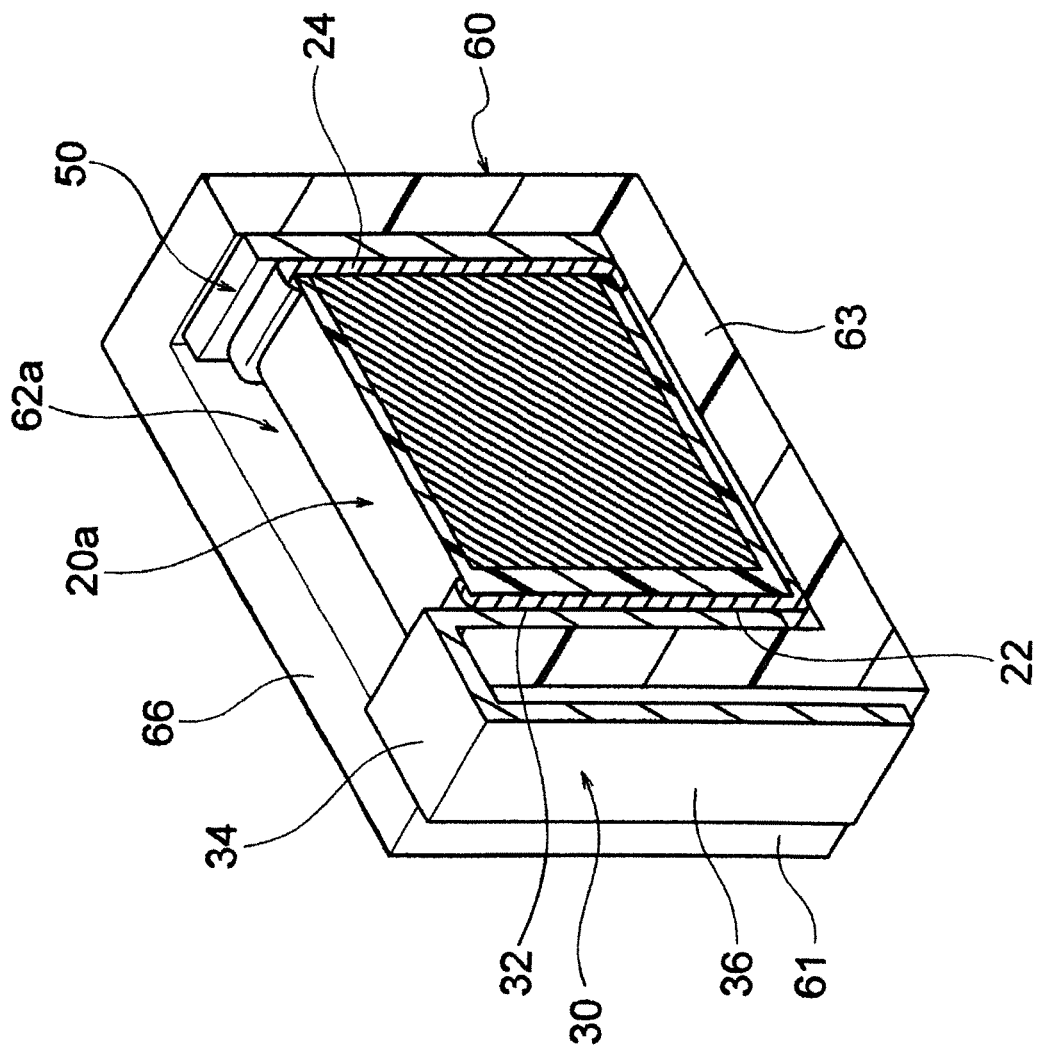
FIG. 4 is a cross-sectional view of the electronic device along the line IV-IV shown in FIG. 1.

Further, a side electrode part 36 is formed integrally with the opening edge electrode part 34 along the outer side face (outer side wall) of the outer wall 61 of the insulating case 60 to be continuous to the opening edge electrode part 34. According to the embodiment, the side electrode part 36 is formed to extend in the Z-axis direction along the outer face of the outer wall 61. As shown in FIG. 4, the side electrode part 36 does not need to be in contact with the outer wall face of the outer wall 61 and may be arranged in parallel with a predetermined gap on the outer wall face of the outer wall 61. Moreover, although it is preferable that the opening edge electrode part 34 contacts the opening edge face 66 of an outer wall, there may be some gaps.

As shown in FIGS. 1 and 2A, the second individual metal terminal 40 has an inner electrode part 42 that is inserted along the other inner wall in the X-axis direction of the other accommodation recess 62b in the insulating case 60. As shown in FIG. 3, the inner electrode part 42 is in contact with and electrically connected to the first terminal electrode 22 of the other capacitor chip 20b in the Y-axis direction. An opening edge electrode part 44 is formed over the opening edge face 66 to be continuous to the inner electrode part 42.

A side electrode part 46 is formed integrally with the opening edge electrode part 44 along the outer face of the outer wall 61 in the insulating case 60 to be continuous to the opening edge electrode part 44. In the embodiment, the side electrode part 46 is formed to extend in the Z-axis direction along the outer surface of the outer wall 61.

The side electrode part 46 does not need to be in contact with the outer wall face of the outer wall 61, similar to the side electrode part 36 and may be arranged in parallel to the outer wall face of the outer wall 61 with a predetermined gap. Moreover, although it is preferable that the opening edge electrode part 44 contacts the opening edge face 66 of an outer wall, there may be some gaps. The first individual metal terminal 30 and the second individual metal terminal 40 are attached to the insulating case 60 at a predetermined interval (corresponding to the thickness of the partition wall 64 in the Y axis direction) in the Y axis direction, and mutually insulated.

According to the embodiment, the lengths of the accommodation recesses 62a and 62b in the X-axis direction is determined so that the terminal electrodes 22 and 24 of the capacitor chips 20a and 20b are to be in pressure contact with the inner electrode parts 32, 42, and 52, when the terminals 30, 40 and 50 are attached to the insulating case 60. The terminal electrodes 22 and 24 of the capacitor chips 20a and 20b may be in pressure contact with the inner electrode parts 32, 42 and 52 by deforming an elastic sheet, which is interposed between the inner electrode parts 32, 42, 52 of the terminals 30, 40, 50 and the inner wall surfaces of the accommodation recesses 62a, 62b.

The widths of the accommodation recesses 62a and 62b in the Y-axis direction are determined so that the capacitor chips 20a and 20b can enter the accommodation recesses 62a and 62b. Further, the depth of each accommodation recesses 62a and 62b in the Z-axis direction is determined such that the upper ends of the chips 20a and 20b in the Z-axis direction do not protrude from the upper parts of the opening edge face 66 in the Z-axis direction, when capacitor chips 20a and 20b are accommodated in each accommodation recesses 62a and 62b. However, the upper ends of the chips 20a and 20b in the Z-axis direction may slightly protrude from the opening edge face 66 to the upper part in the Z-axis direction. The insulating case 60 is made of an insulator such as ceramic, glass, or synthetic resin, and the insulator may be made of a flame retardant material.

According to the embodiment, the capacitor chips 20a and 20b can be easily accommodated in the accommodation recesses 62a and 62b. The capacitor chips 20a and 20b can be effectively protected from such as an impact by accommodating the capacitor chips 20a and 20b in the accommodation recesses 62a and 62b.

According to the embodiment, as shown in FIG. 2A, the common metal terminal 50 connects the second terminal electrodes 24, 24 of different capacitor chips 20a, 20b at a place facing the metal terminals 30, 40. The first individual metal terminal 30 and the second individual metal terminal 40 are respectively connected to the first individual metal terminals 22 and 22 of the different capacitor chips 20a and 20b. As a result, the capacitor chips 20a and 20b are connected in series between the first individual metal terminal 30 and the second individual metal terminal 40.

The first individual metal terminal 30 and the second individual metal terminal 40 have the same configuration and are formed by bending one conductive plate piece (for example, a metal plate) into a substantially C shape. The thickness of the metal plate is not particularly limited, but is preferably around 0.01 to 2.0 mm. The thickness of the metal plate constituting the common metal terminal 50 is also approximately the same as that of the first individual metal terminal 30 and the second individual metal terminal 40.

Hereinafter, the producing method of the electronic device 10 is described.

Each capacitor chip 20a and 20b is produced by a general method for producing a multilayer ceramic capacitor.

According to the production of the first individual metal terminal 30, a flat metal plate is prepared at first. The material of the metal plate is not particularly limited, if it is a conductive metal material. For instance, iron, nickel, copper, silver, or an alloy containing thereof can be used. Next, an intermediate member, having the shapes of the inner electrode part 32, the opening edge electrode part 34, and the side electrode part 36, is obtained by machining the metal plate material.

Next, the first individual metal terminal 30 is obtained by forming a metal coat by plating on the surface of the intermediate member formed by machining. Although the material used for plating is not particularly limited, Ni, Sn, Cu etc. are exemplified. According to the production of the first individual metal terminal 30, first individual metal terminals 30 may be formed in a state of being connected to each other from a metal plate material that is continuous in a strip shape. The production method of the second individual metal terminal 40 is the same as that of the first individual metal terminal 30.

According to the production method of the common metal terminal 50, the above-described metal plate material may be machined to obtain an intermediate member having the shape of the common metal terminal 50, and a metal coat formed by plating may be formed thereon. The insulating case 60 can be produced by such as an injection molding.

The first individual metal terminal 30, the second individual metal terminal 40 and the common metal terminal 50 obtained as described above are attached to the insulating case 60. The metal terminals 30 and 40 can be attached to the insulating case 60 by respectively inserting inner electrodes 32, 42 along the inner wall face formed on one side of the accommodation recesses 62a and 62b of the insulating case 60 in the X-axis direction. The common metal terminal 50 can be attached to the insulating case 60 by inserting inner electrode part 52 in the connecting groove 65 along the inner wall faces of the accommodation recesses 62a and 62b.

Finally, the electronic device 10 shown in FIG. 1 can be produced simply by inserting the capacitor chips 20a and 20b from above the openings into each of the accommodation recesses 62a and 62b.

According to the electronic device 10 of the embodiment, the electronic device 10 is assembled only by accommodating the capacitor chips 20a and 20b in the accommodation recesses 62a and 62b from the opening provided on only one face of the insulating case 60. In addition, by attaching the inner electrode part 52 of the common metal terminal 50 along the inner wall of the insulating case 60, the capacitor chips 20a, 20b can be easily connected in series.

In addition, without using the common metal terminal 50, it becomes possible to connect capacitor chips 20a, 20b in parallel by attaching the same individual metal terminals 30, 40 to both inner wall faces of the respective accommodation recesses 62a, 62b in the X-axis direction.

Furthermore, according to the electronic device 10 of the embodiment, the opening edge electrode parts 34, 44 and the side electrode parts 36, 46 of the individual metal terminals 30, 40 are drawn out of the insulating case 60. For this reason, it is not necessary to provide such as a through-hole in the inner wall face which configures the accommodation recesses 62a, 62b of case 60. Therefore, even if the molten resin is filled in the accommodation recesses 62a, 62b of the case 60 in which the capacitor chips 20a, 20b are accommodated, it is possible to effectively prevent resin protruding from the through holes. That is, according to the embodiment, each accommodation recessed parts 62a, 62b can be used also as a filling space of resin.

Figure 5A:
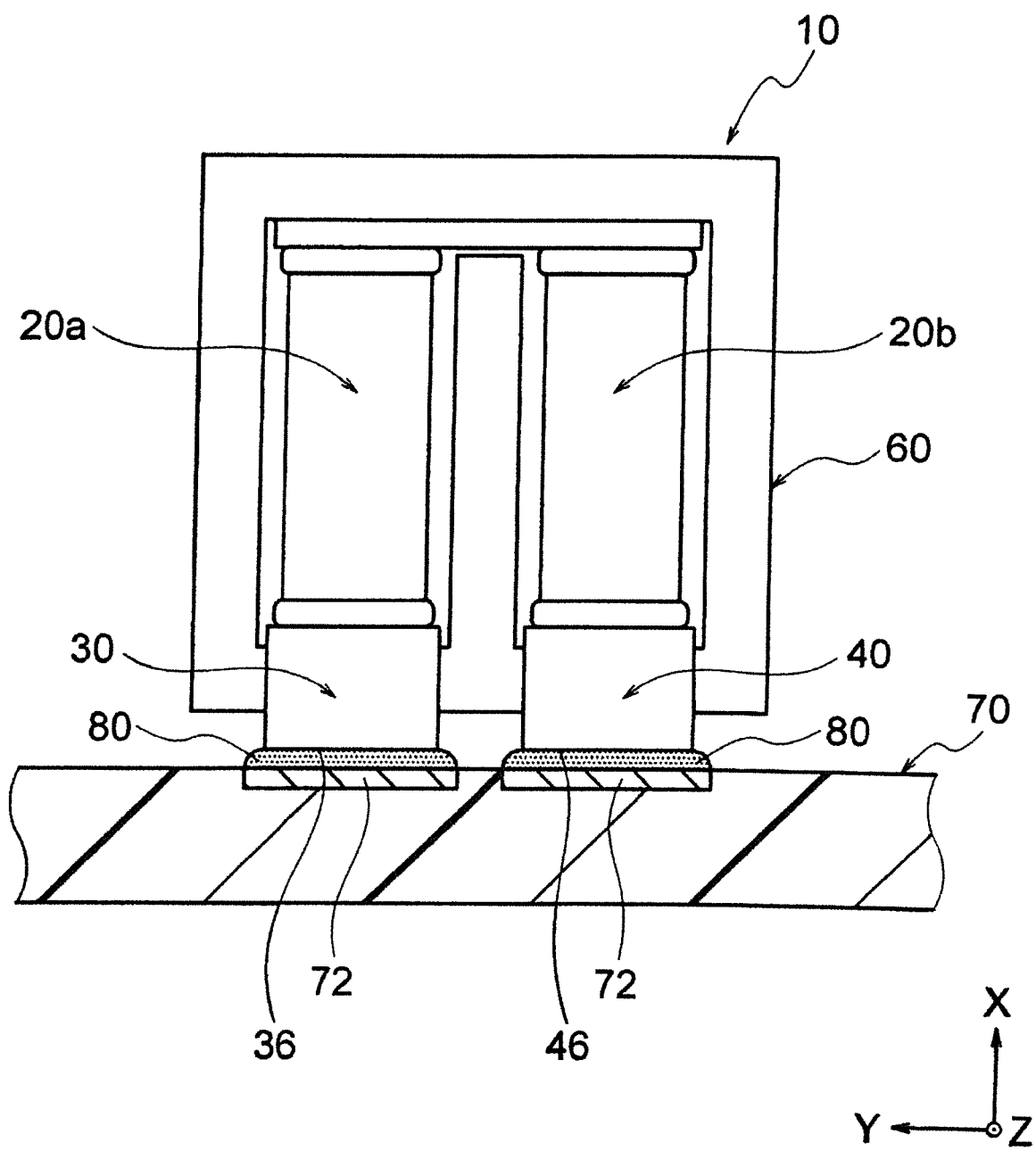
FIG. 5A is a front view showing an example of a mounting state of the electronic device shown in FIG. 1
Figure 5B:
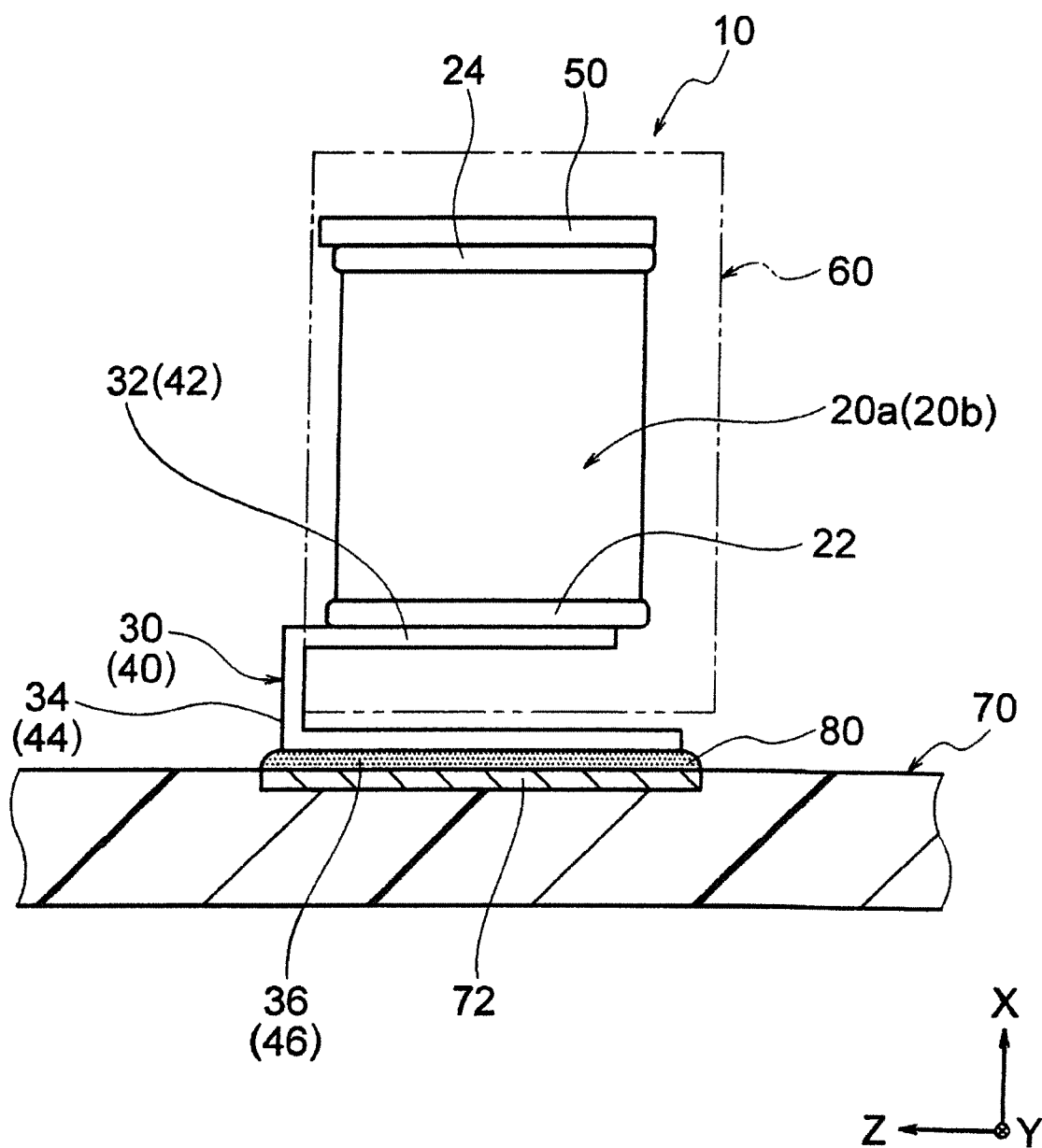
FIG. 5B is a side view showing the other example of a mounting state of the electronic device shown in FIG. 1

According to the electronic device 10 of the embodiment, as shown in FIGS. 5A and 5B, the side electrode parts 36, 46 of the individual metal terminals 30, 40 exposed outside of the insulating case 60 are used as the mounting electrode faces. In particular, by using the side electrode parts 36, 46 as mounting electrode faces, the strength of fixing the electronic device 10 to the individual circuit patterns 72, 72 of the circuit board (external circuit) 70 can be improved.

The individual circuit patterns 72, 72 of the circuit board (external circuit) 70 and the side electrode parts 36, 46 of the electronic devices 10 can be connected by such as solder 80, however, it may be connected with a connecting member other than solder. Examples of the connection member other than the solder 80 include a conductive adhesive and an anisotropic conductive tape. Further, by forming such as a gap between the side electrode parts 36, 46 and the outer face of the side wall of the case 60, it becomes easy to suppress such as resonance of the electronic device 10.

As shown in FIGS. 5A and 5B, in order to connect the individual circuit patterns 72, 72 of the circuit board (external circuit) 70 and the side electrode parts 36, 46 of the electronic device 10, the surface of the circuit board 70 is arranged substantially perpendicular to the X axis.

Figure 5C:
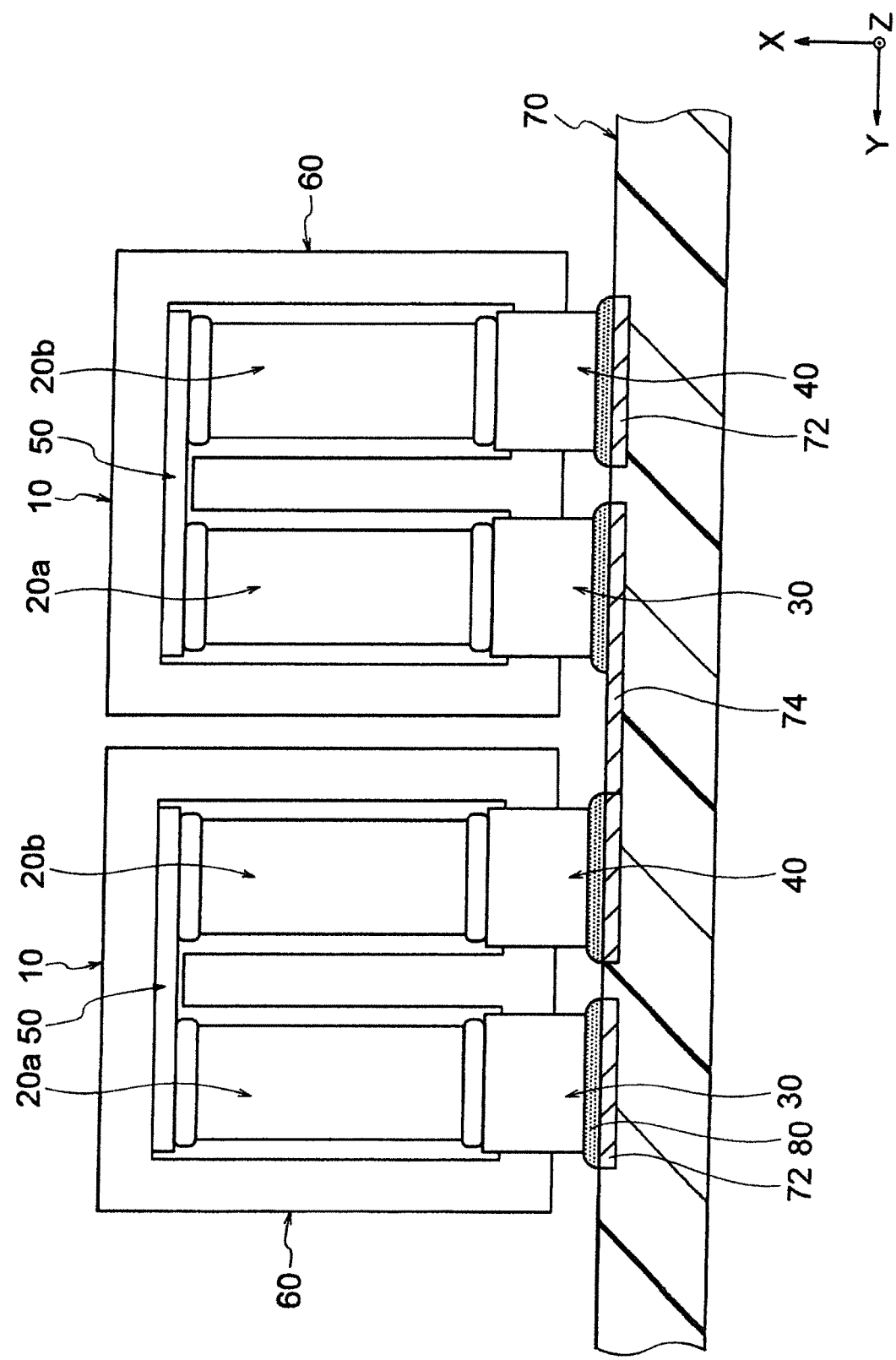
FIG. 5C is a front view showing the other example of a mounting state of the electronic device shown in FIG. 1

According to the embodiment, as shown in FIG. 5C, by arranging insulating cases 60 of the electronic devices 10 side by side, the individual metal terminals 30, 40 of the different insulating cases 60 can be mutually connected with the common circuit pattern 74 of the circuit board 70. In this case, a total of four capacitor chips 20a, 20b, 20a and 20b can be connected in series. That is, the degree of freedom of mounting the electronic device 10 is also improved. Moreover, the electronic device 10 of the embodiment is relatively compact. Further, by connecting the first individual metal terminal 30 and the second individual metal terminal 40 with such as an external conductor, instead of connecting with the common circuit pattern 74 of the circuit board 70, a capacitor that forms four series circuits can be configured.

According to the embodiment, as shown in FIG. 1, the accommodation recesses 62a, 62b are provided with the partition wall 64 that partitions adjacent capacitor chips 20a and 20b. Thus, the capacitor chips 20a and 20b can be easily attached. In addition, it is easy to insulate adjacent capacitor chips 20a and 20b. Further, since the connecting groove 65 is formed in the partition wall 64, the inner electrode part 52 of the common metal terminal 50 can be easily inserted into the accommodation recesses 62a, 62b.

According to the embodiment, as exemplified in FIG. 5B, it is preferable that at least the surfaces of the inner electrode parts 32, 42 of the individual metal terminals 30 and 40 are subjected to a solder adhesion preventing process. With this configuration, the solder 80 can be prevented from entering close to the terminal electrodes 22 of the capacitor chips 20a and 20b, and so-called solder bridges can be effectively prevented.

Note that the face of the side electrode parts 36, 46 is not subjected to the solder adhesion prevention treatment, but rather is subjected to surface treatment (including a coat formation) on which the solder 80 is likely to adhere. As for the faces of the opening edge electrode parts 34 and 44, it is case-by-case. It is possible to suppress the solder rising by performing the solder adhesion prevention treatment, but it is not necessary to perform the solder adhesion prevention treatment when emphasizing the fixation by the solder 80. Examples of the solder adhesion preventing process include a peeling process such as a tin plating film or coating to which the solder 80 is likely to adhere.

Further, according to the electronic device 10 of the embodiment, the metal terminals 30, 40, 50 and the capacitor chips 20a, 20b can be connected without using solder. For this reason, it becomes possible to use copper, a copper alloy, etc. as a material of the metal terminal, and can reduce ESR (equivalent series resistance). Further, since no solder is used, it is possible to reduce the risk of cracks occurring in the capacitor chip due to a difference in thermal expansion.

The opening edge electrode parts 34, 44 may be mounted on the individual circuit pattern 72 or the common circuit pattern 74. In this case, since the opening face of the case 60 is disposed on the mounting face side, the case 60 can serve as a protective cover.

Second Embodiment

Figure 6A:
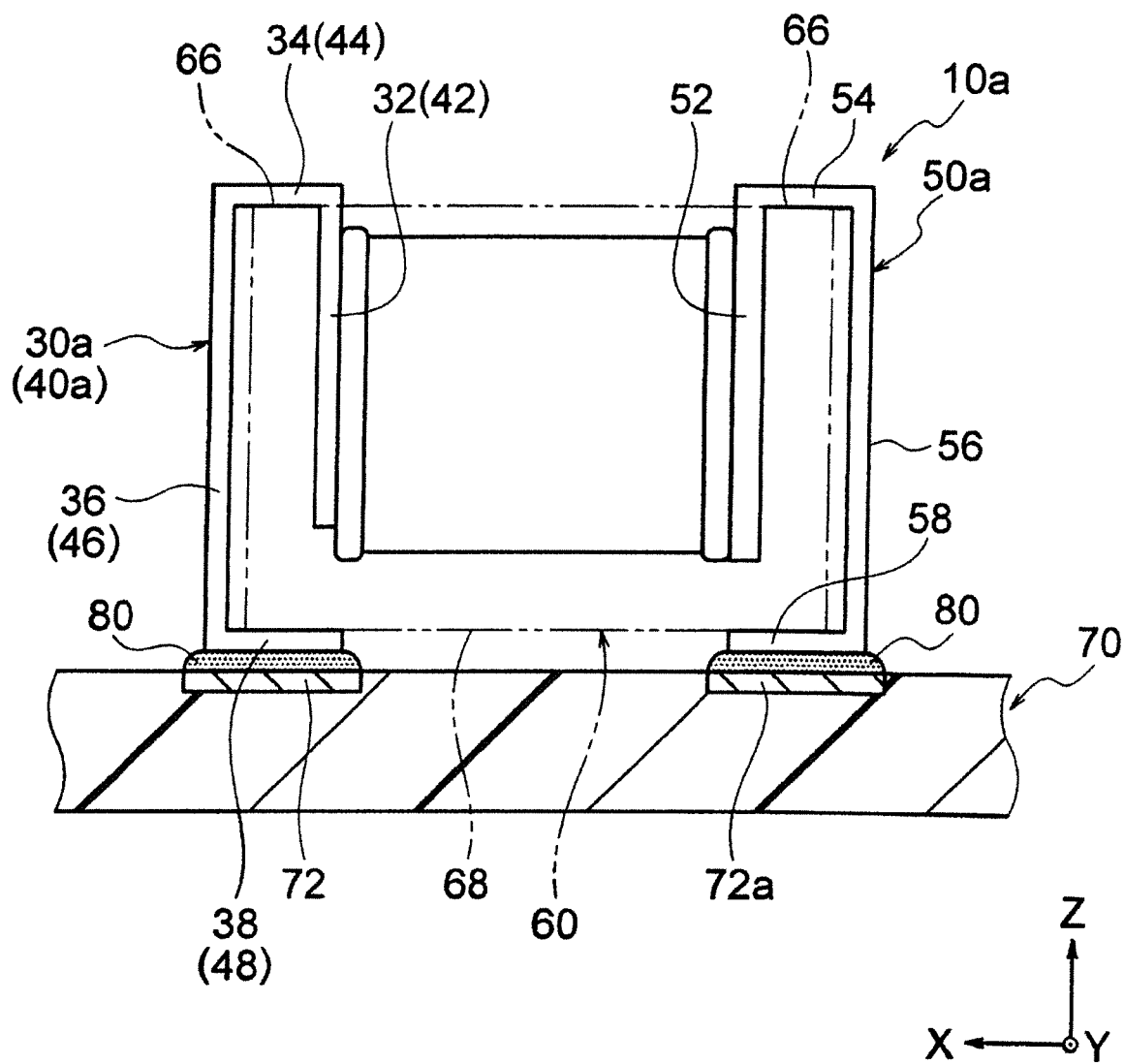
FIG. 6A is a side view showing an example of a mounted state of the electronic device according to another embodiment of the invention.
Figure 6B:
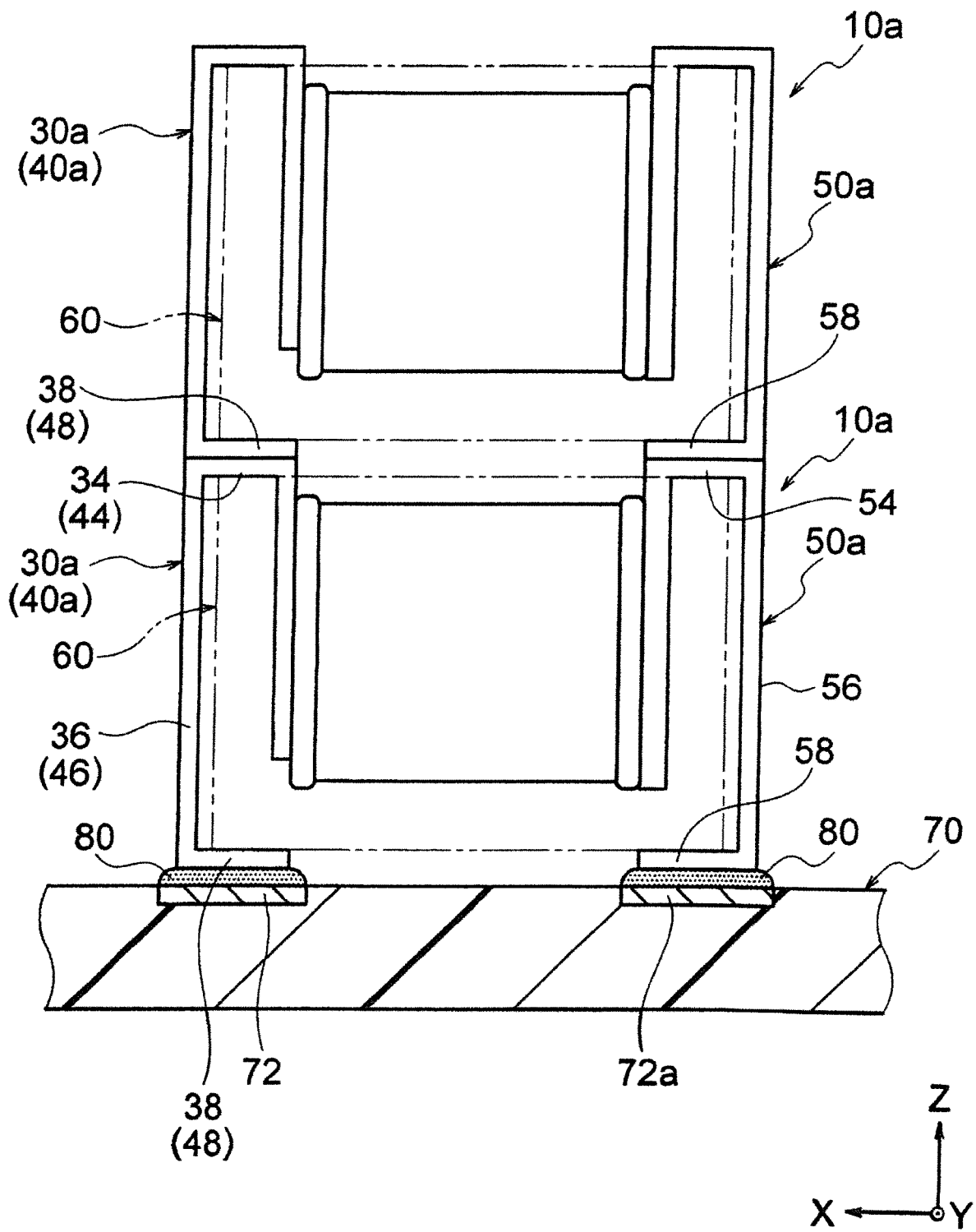
FIG. 6B is a side view showing another example of a mounted state of the electronic device according to the embodiment shown in FIG. 6A.
Figure 6C:
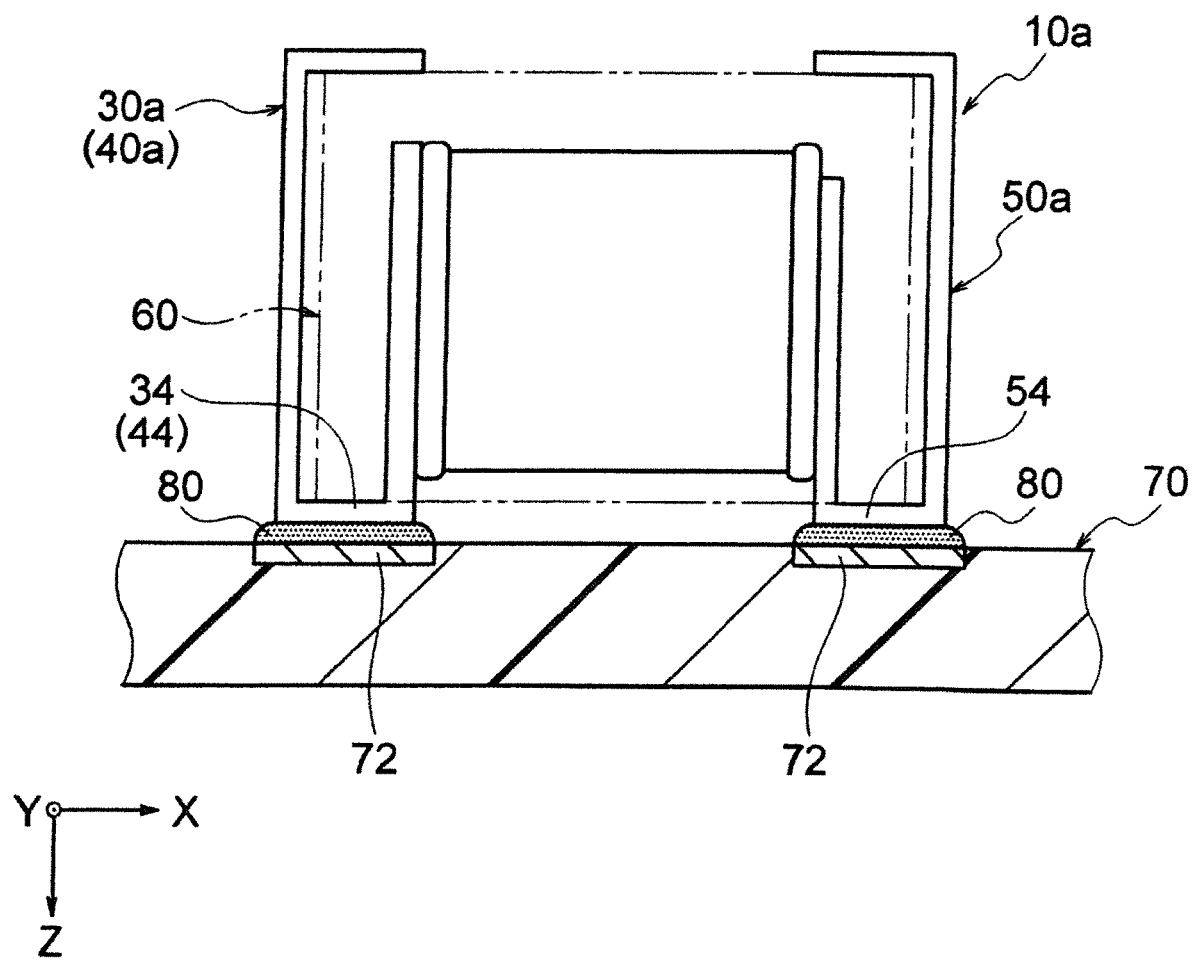
FIG. 6C is a side view showing another example of the mounted state of the electronic device according to the embodiment shown in FIG. 6A.
Figure 7:
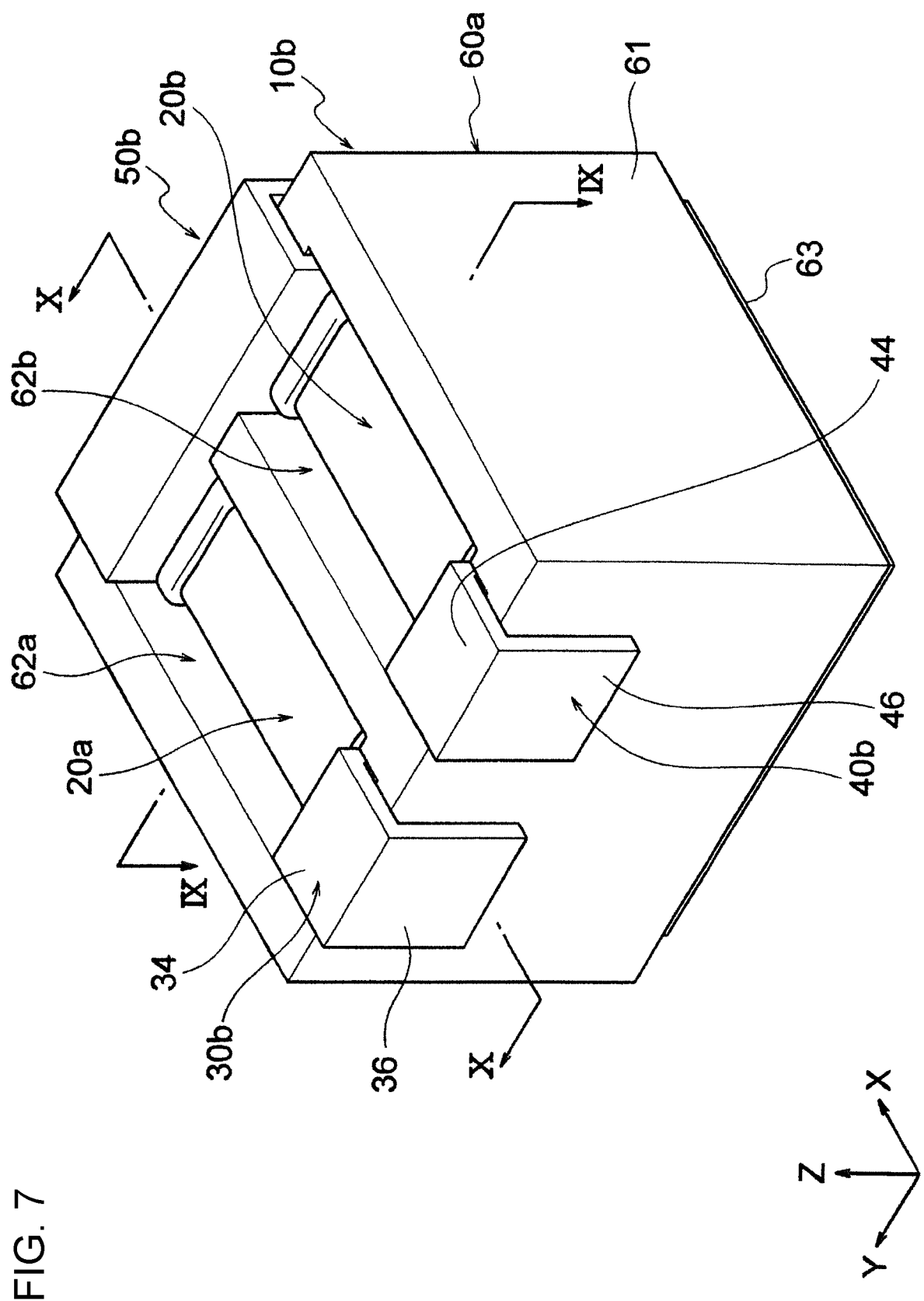
FIG. 7 is a schematic perspective view of an electronic device according to another embodiment of the invention.

The electronic device 10a according to the embodiment shown in FIGS. 6A to 6C has the same configuration as that of the electronic device 10 according to the first embodiment, except for the following points, and has the same effects. In FIGS. 6A to 6C, members that are the same as those in the electronic device 10 of the first embodiment are given the same reference numerals, and descriptions thereof are partially omitted.

According to the electronic device 10a of the embodiment, the individual metal terminals 30a, 40a further include the anti-opening electrode part 38, 48, formed to be continuous to the side electrode part 36, 46 on the anti-opening surface (a bottom surface) 68 of the insulating case 60 located on the opposite side of the opening edge face 66.

Further, the common metal terminal 50a further include the opening edge electrode part 54 formed along the opening edge face 66 to be continuous to the inner electrode part 52, and a side electrode part 56 formed along the outer face of the insulating case 60 to be continuous to the inner electrode part 52. In addition, the common metal terminal 50a further includes the anti-opening electrode part 58, formed to be continuous to the side electrode part 56 on the anti-opening surface 68 of the case located on the opposite side of the opening edge face 66.

According to the electronic device 10*a* of the embodiment, as shown in FIG. 6A, the anti-opening electrode parts 38, 48, and 58 can be used as the mounting electrode faces. That is, the anti-opening electrode parts 38, 48, and 58 can be connected to the individual circuit patterns 72, 72*a* of the circuit board 70 through solder 80, respectively. The individual circuit pattern 72*a* to which the common metal terminal 50*a* is connected may be a floating pattern that is not connected to other circuit patterns.

As shown in FIG. 6A, when the individual circuit pattern 72*a*, to which the common metal terminal 50*a* is connected, is connected to another circuit pattern, two capacitors of a parallel circuit can be configured. On the other hand, when the individual circuit pattern 72*a* to which the common metal terminal 50*a* is connected is a floating pattern that is not connected to other circuit patterns, two capacitors of a series circuit can be configured. Further, the anti-opening electrode parts 38, 48 of the individual metal terminals 30*a*, 40*a* and the anti-opening electrode parts 58 of the common metal terminal 50*a* are connected to the individual circuit patterns 72 and 72*a*. Thus, mounting strength between the electronic device 10*a* and the circuit board 70 can be improved, and resonance can be prevented.

Further, as shown in FIG. 6B, the electronic devices 10*a* of the embodiment may be stacked and connected in the Z-axis direction. In this case, the anti-opening electrode parts 38, 48, and 58 of the metal terminals 30*a*, 40*a*, 50*a* of the electronic device 10*a* stacked on the upper side are connected to the opening edge electrode parts 34, 44, and 54 of the metal terminals 30*a*, 40*a*, 50*a* of the electronic device 10*a* placed on the lower side. The method for the connection is not particularly limited, and a method using a conductive adhesive, laser welding, solder, or the like is conceivable.

As shown in FIG. 6B, when the individual circuit pattern 72, to which the common metal terminal 50*a* is connected, is connected to the other circuit pattern, four capacitors can be four parallel circuits. On the other hand, when the individual circuit pattern 72*a*, to which the common metal terminal 50*a* is connected, is a floating pattern that is not connected to the other circuit pattern, the four capacitors can be a two series and two parallel circuits.

Further, according to the electronic device 10*a* of the embodiment shown in FIG. 6C, the opening edge electrode parts 34, 44, 54 of the metal terminals 30*a*, 40*a*, 50*a* may be connected to the circuit pattern 72 of the circuit board 70 with solder or the like, by arranging the opening face of the insulating case 60 to face downward in the Z-axis direction. According to the electronic device 10*a* of the embodiment, variations of mounting such as on a circuit board can be increased. Further, since the opening face of the case 60 is disposed on the mounting face side, the case 60 can serve as a protective cover. Furthermore, the opening electrode parts 34, 44 of the individual metal terminals 30*a*, 40*a* and the opening edge electrode part 54 of the common metal terminal 50*a* are connected to the individual circuit patterns 72, 72*a*, so that the mounting strength between electronic device 10*a* and the circuit board 70 can be improved. Also, resonance can be prevented.

Third Embodiment

The electronic device 10*b* according to the embodiment shown in FIGS. 7 to 11 has the same configuration as that of the electronic device 10 or 10*a* according to the above embodiments, except for the following points, and has the same effects. According to FIGS. 7 to 11, members that are the same as those in the electronic device 10 of the first embodiment are given the same reference numerals, and descriptions thereof are partially omitted.

Figure 8A:
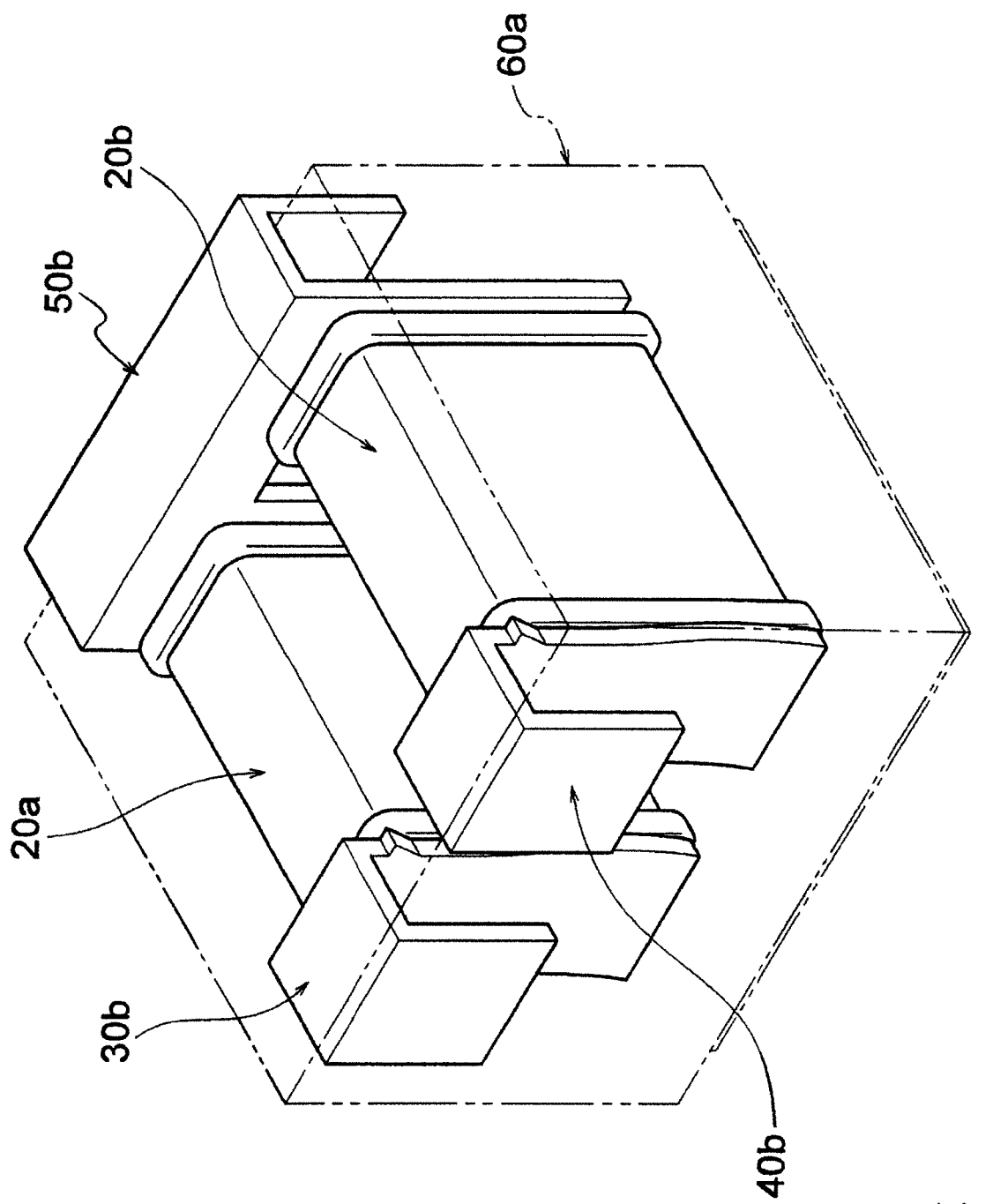
FIG. 8A is a schematic perspective view of the electronic device of FIG. 7 showing inside by the transparent case.
Figure 8B:
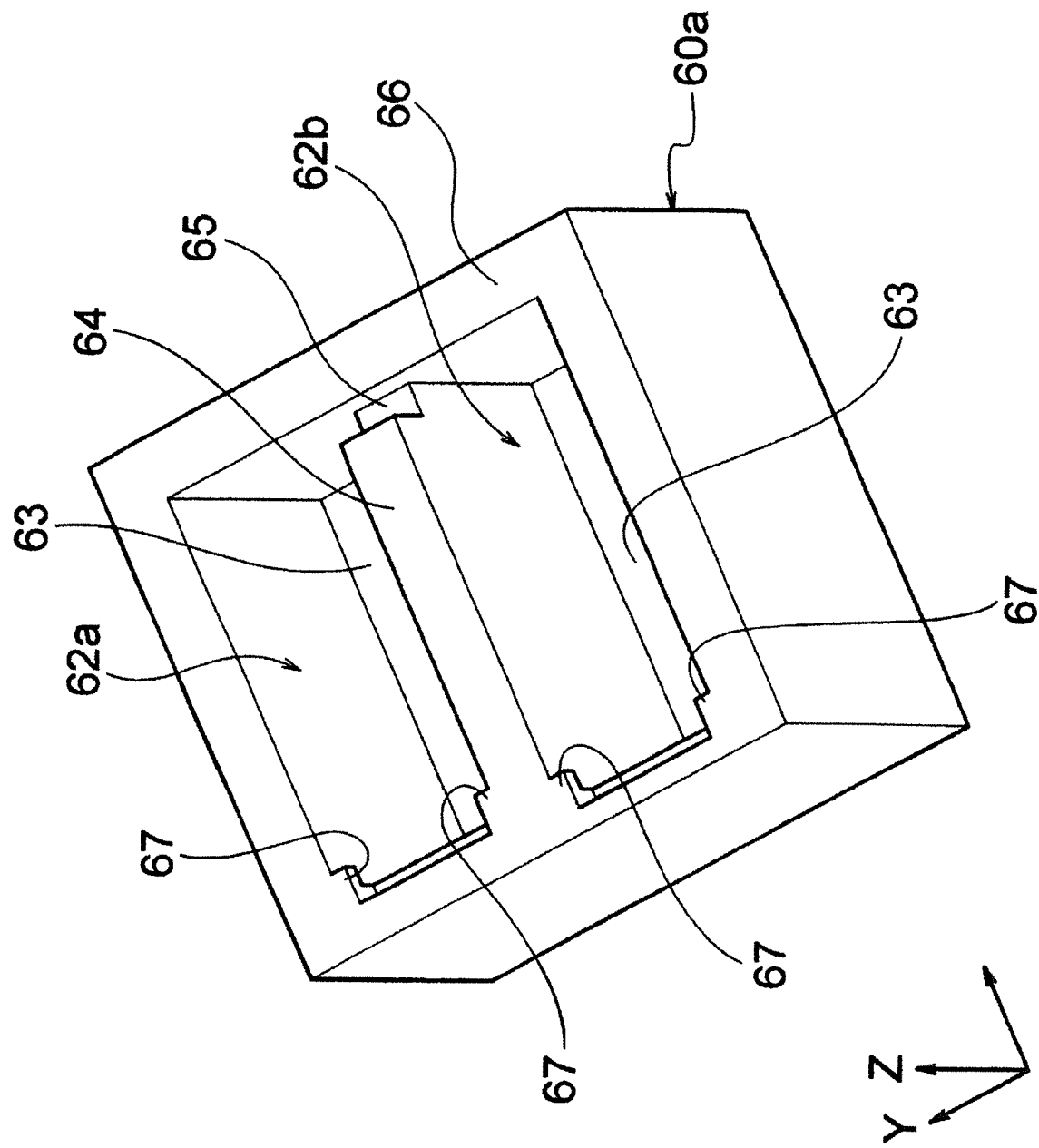
FIG. 8B is a schematic perspective view of the case shown in FIG. 7 viewed from a different angle.

According to the electronic device 10*b* of the embodiment, as shown in FIG. 8B, the insulating case 60*a* has accommodation recesses 62*a*, 62*b* separated by the partition wall 64. The groove depth in the Z-axis direction of the connecting groove 65 is formed shallower than the groove depth of the connecting groove 65 of the above-described embodiment. And the bottom wall 63 is formed separately for each of the accommodation recesses 62*a*, 62*b*. Engagement convex 67 are formed at the corners of the opening faces of the accommodation recesses 62*a*, 62*b* located on the opposite side of the communication groove 65 in the X-axis direction.

Figure 8C:
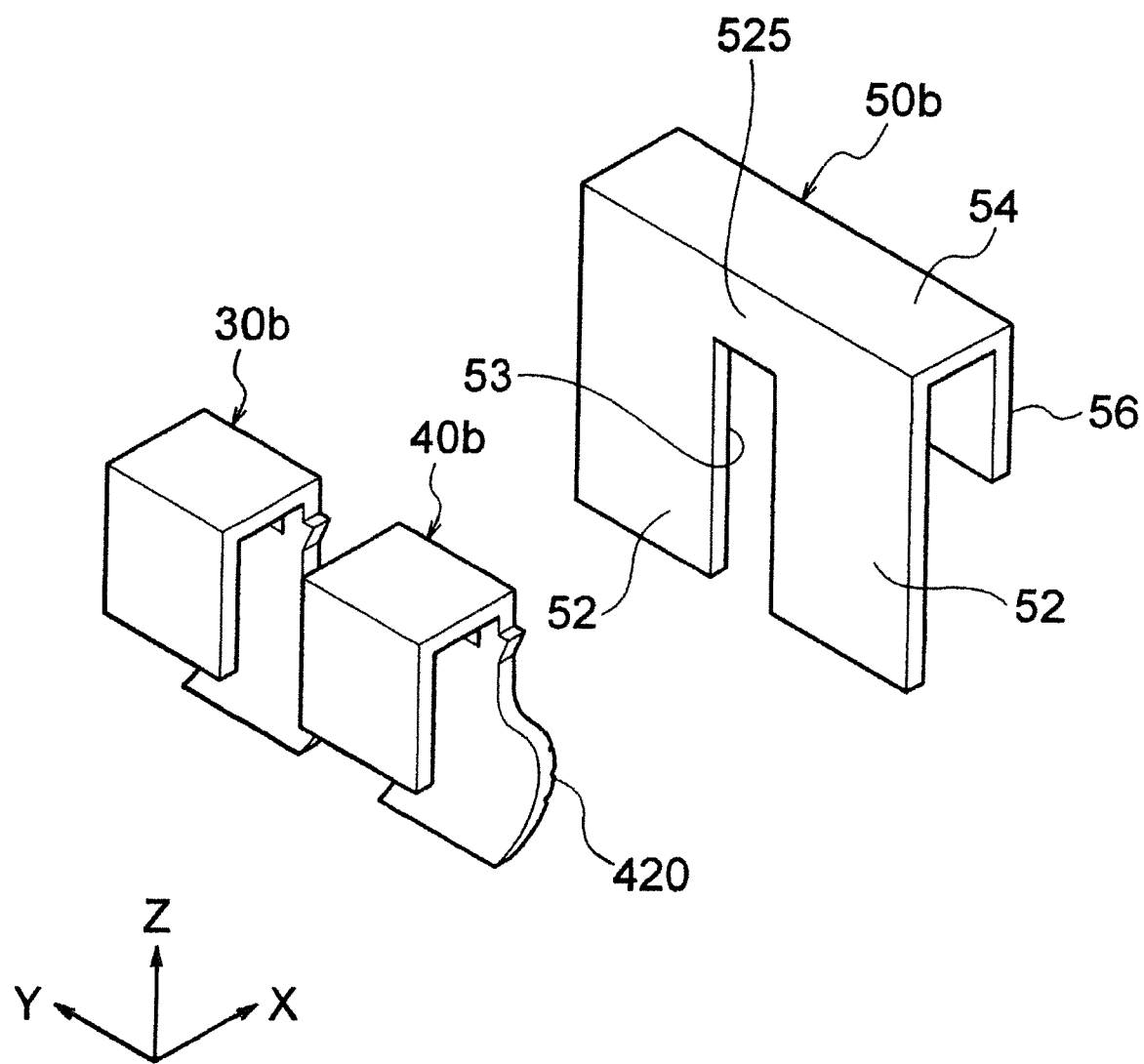
FIG. 8C is a schematic perspective view of the metal terminal shown in FIG. 7

As shown in FIG. 8C, the common metal terminal 50*b* includes a pair of inner electrode parts 52. These are separated by a slit 53 extending in the Z-axis direction, and are connected by a connecting piece 525 and an opening edge electrode part 54. Side electrode parts 56 are continuously formed to the opening edge electrode part 54. Each inner electrode part 52 is inserted into the inner wall face in the X-axis direction on the side where the communication groove 65 of the accommodation grooves 62*a* and 62*b* shown in FIG. 8B is formed, and the connecting piece 525 shown in FIG. 8C engage with the communication groove 65.

Figure 8D:
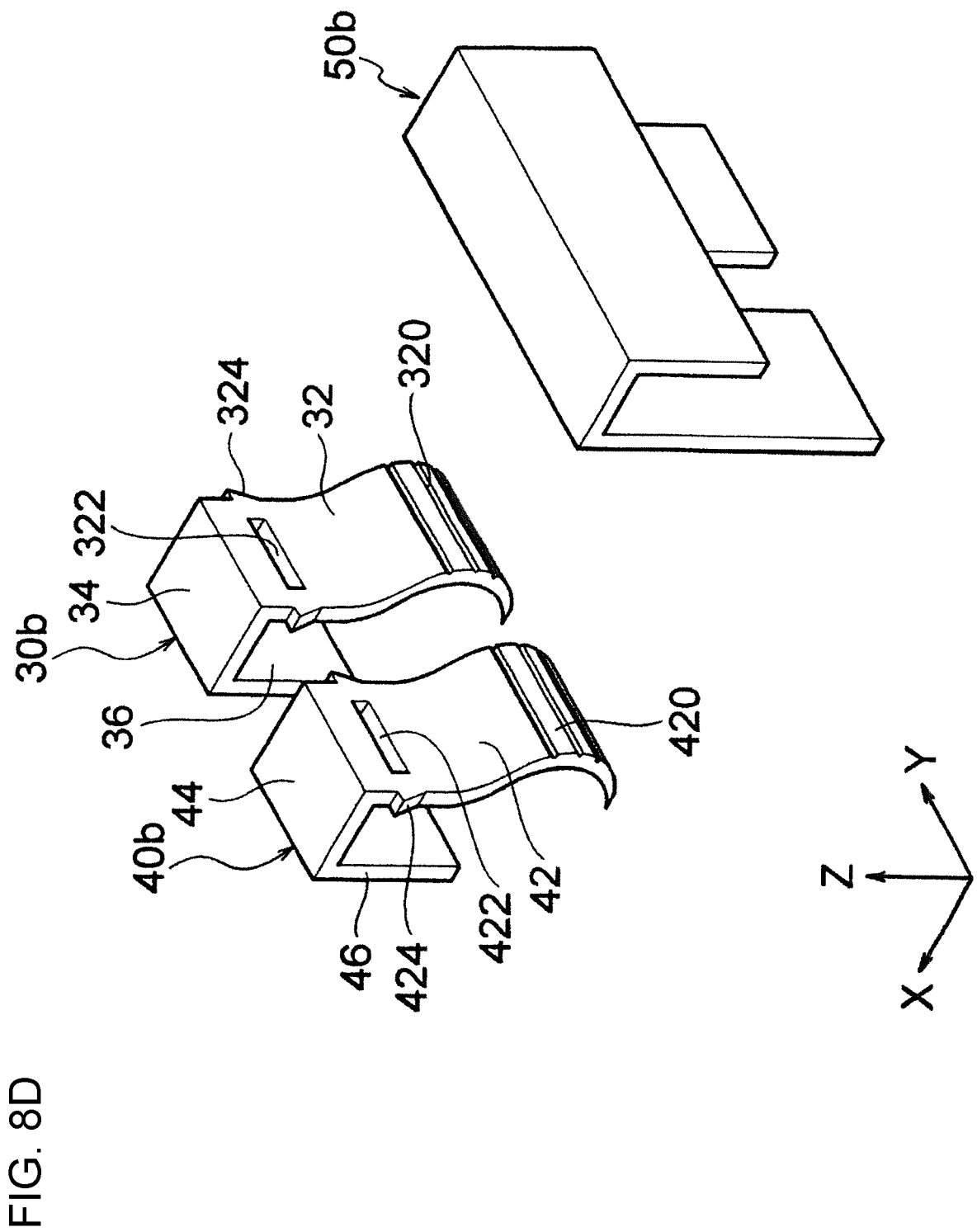
FIG. 8D is a schematic perspective view of the metal terminal shown in FIG. 8C viewed from a different angle.

In this embodiment, as shown in FIG. 8D, the individual metal terminal 30*b* (40*b*) includes inner electrode part 32(42) inserted along one inner wall in the X-axis direction of the accommodation recess 62*a* (62*b*) of the insulating case 60*a* shown in FIG. 8B. According to the embodiment, an elongated through hole 322(422) is formed close to the opening edge electrode part 34(44) in the inner electrode part 32(42) along the width direction (the Y-axis direction).

Figure 11:
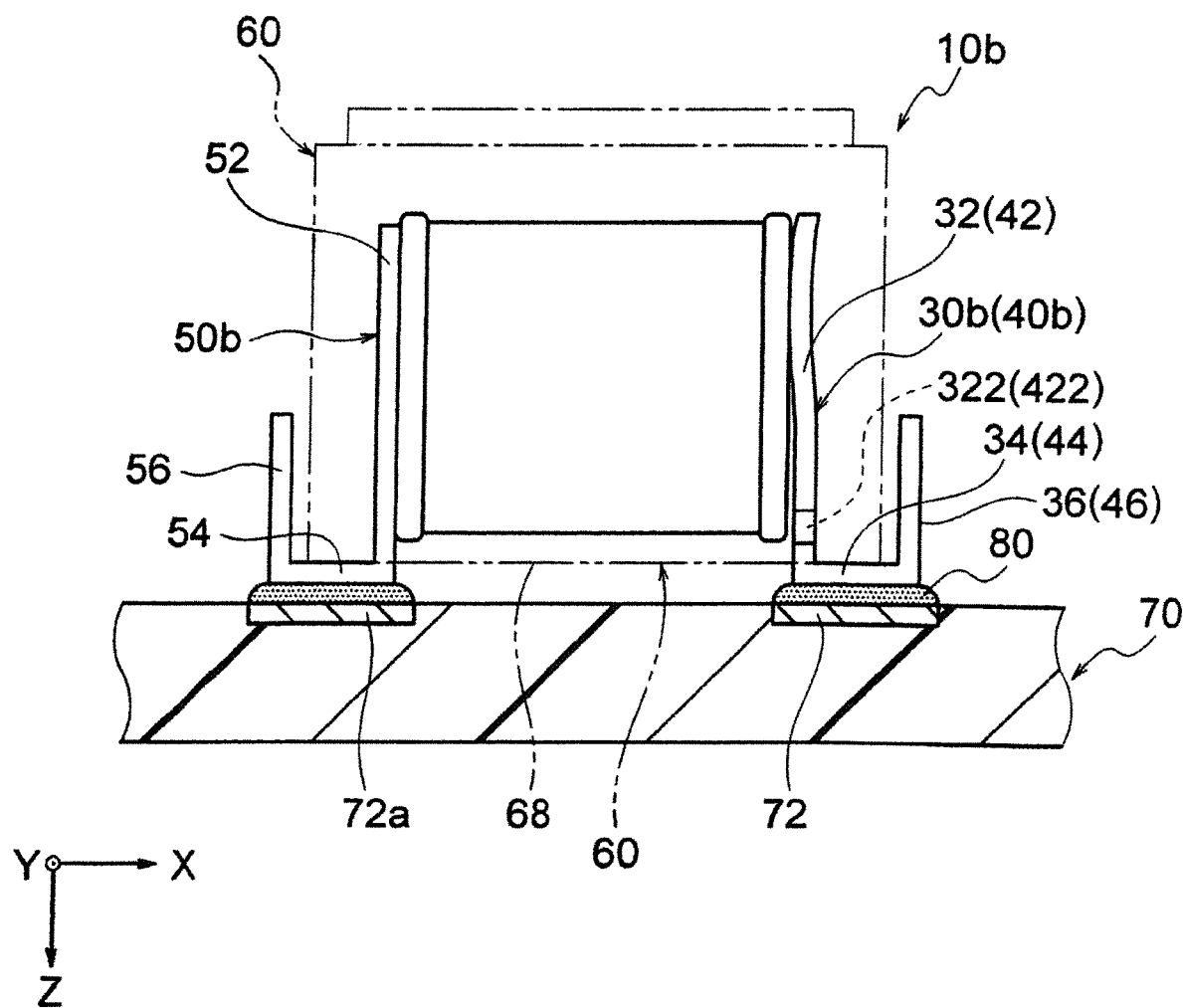
FIG. 11 is a partially transparent side view showing an example of a mounted state of the electronic device shown in FIG. 7.

By forming the through-hole 322(422), solder wicking toward the inner electrode part 32(42) can be prevented when the opening edge electrode part 34(36) is connected to such as the circuit board 70 with such as solder 80 as shown in FIG. 11. That is, so-called solder bridge can be effectively prevented.

According to the embodiment, the engagement pieces 324(424) projecting outward along the width direction (the Y-axis direction) may be provided on both sides of the inner electrode part 32(42) close to the opening edge electrode part 34(44). These engagement pieces 324(424) can be respectively engaged with the engagement parts 67, formed on both sides in the Y-axis direction of one inner wall face in the X-axis direction of the accommodation recess 62*a* (62*b*) of the insulating case 60*a* shown in FIG. 8B. The engaging convex part 67 is preferably formed to be flush with the opening edge face 66.

Only by inserting the inner electrode parts 32, 42 of the individual metal terminals 30*b*, 40*b* shown in FIG. 8D into the insulating case 60*a* shown in FIG. 8B, the engagement pieces 324, 424 are engaged with the engagement convex part 67 in a one-touch manner, and the terminals 30*b*, 40*b* can be easily positioned and firmly fixed to the insulating case 60*a*.

Figure 9:
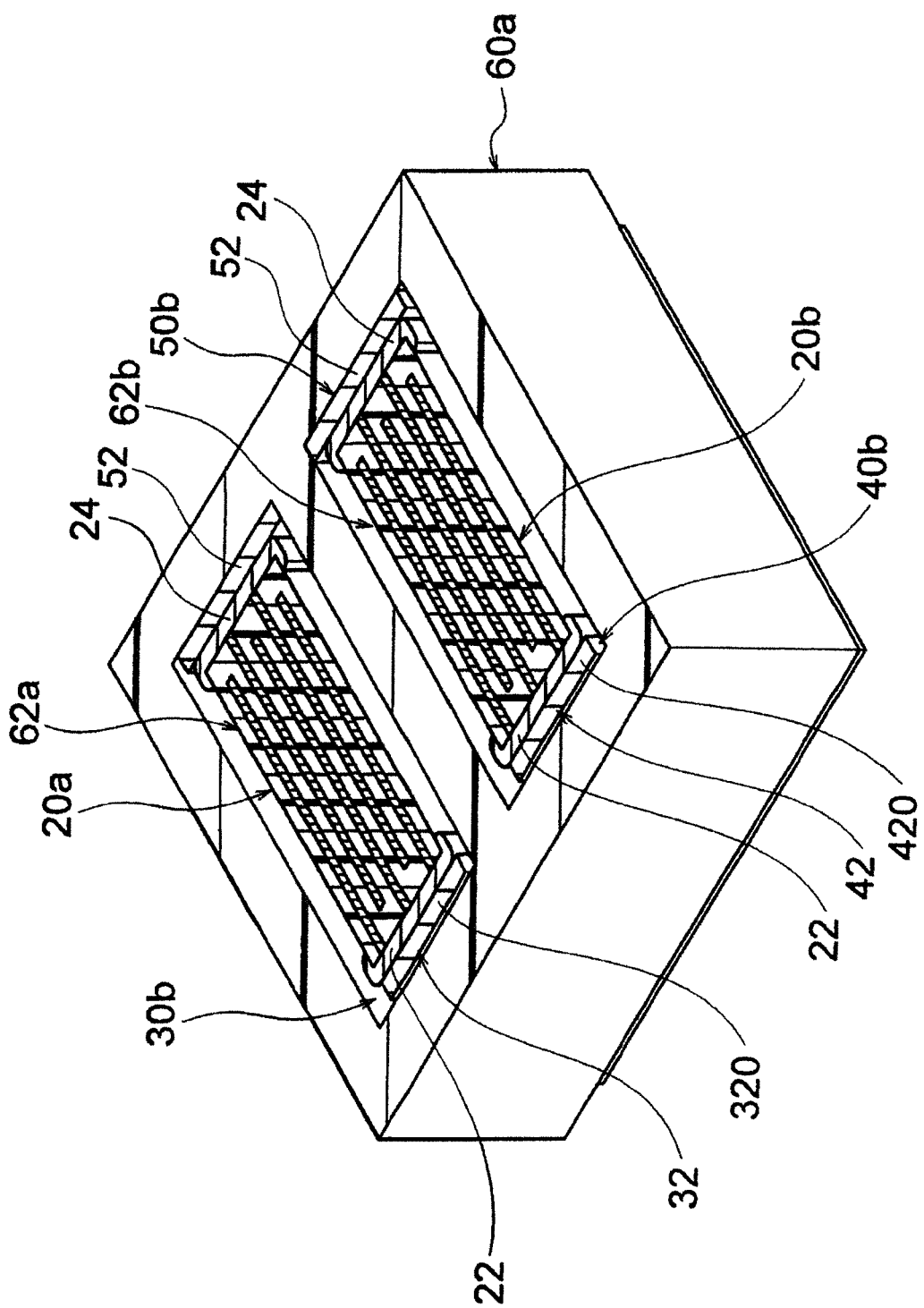
FIG. 9 is a cross-sectional view of the electronic device along the line IX-IX shown in FIG. 7.
Figure 10:
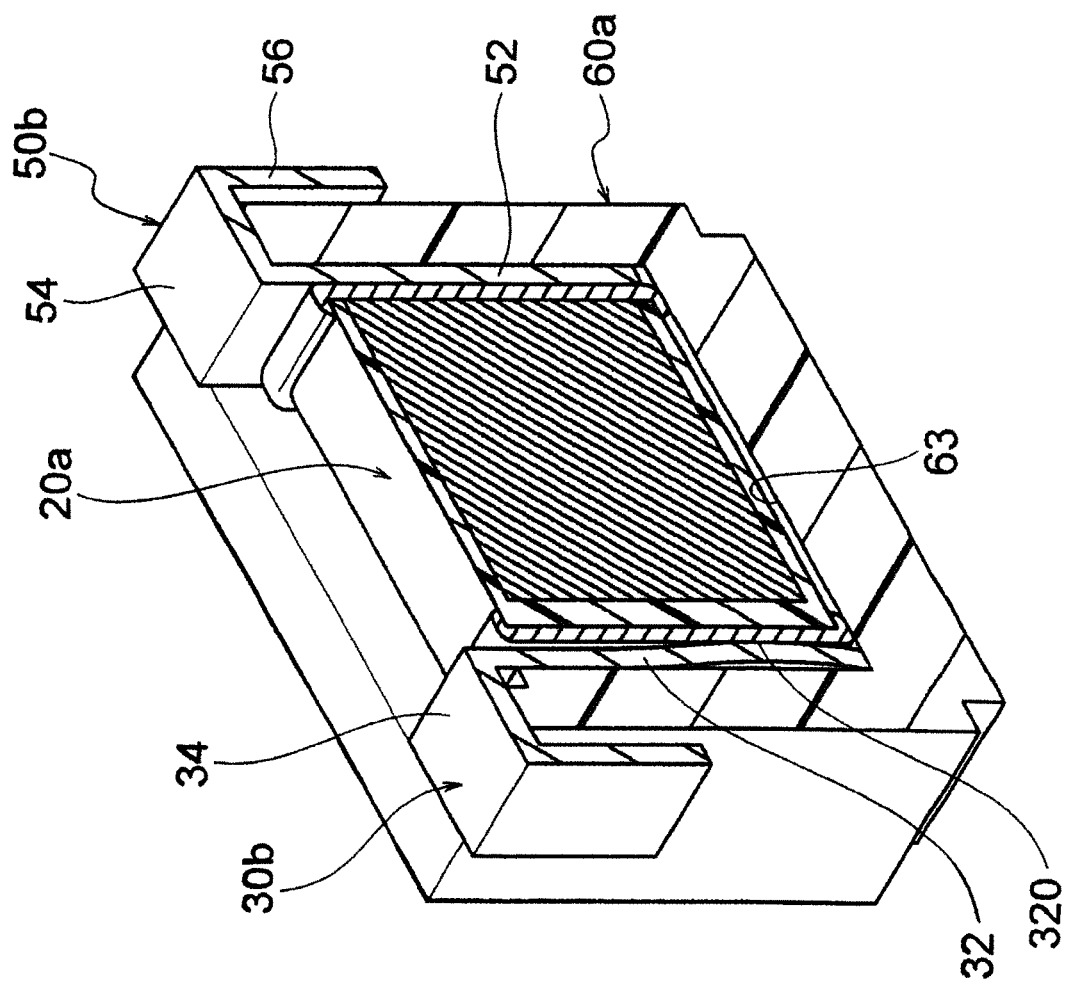
FIG. 10 is a cross-sectional view of the electronic device along the line X-X shown in FIG. 7.

In the embodiment, as shown in FIG. 8D, the inner electrode parts 32, 42 are provided with curved parts 320 (420) that are pressed by the spring force toward the capacitor chips 20*a* and 20*b* shown in FIG. 9. FIG. 10 shows the curved part 320 that is pressed against the capacitor chip 20*a* by a spring force. With this configuration, the inner electrode part 32(42) and the first terminal electrode 22 are connected in a pressure contact state, and the inner electrode part 52 of the common metal terminal 50b and the second terminal electrode 24 are in a pressure contact state. Therefore, it is not necessary to connect them with a connecting member such as solder or a conductive adhesive.

Since the metal terminals 30b, 40b, 50b and the terminal electrodes 22, 24 can be connected without using solder, it becomes possible to use such as copper or copper alloy as the material of the terminals 30b, 40b, 50b. Thus, ESR (Equivalent series resistance) can be reduced. Further, since no solder is used, it is possible to reduce the possibility of cracks and the like occurring in the capacitor chips 20a, 20b due to the difference in thermal expansion.

According to the embodiment, for example, as shown in FIG. 11, the opening electrode parts 34, 44 of the individual metal terminals 30b, 40b and the opening edge electrode part 54 of the common metal terminal 50b are connected to the individual circuit patterns 72, 72a. Thus, the mounting strength between the electronic device 10b and the circuit board 70 can be improved. Also, resonance can be prevented.

When the mounted common metal terminal 50b is connected to another circuit pattern, a two-parallel capacitor circuit can be configured. On the other hand, when the mounted common metal terminal 50b is not connected to another circuit pattern (in the case of a floating pattern), a two-series capacitor circuit can be configured. Furthermore, since the opening face of the case 60 is disposed on the mounting face side, the case 60 can serve as a protective cover.

Fourth Embodiment

Figure 12:
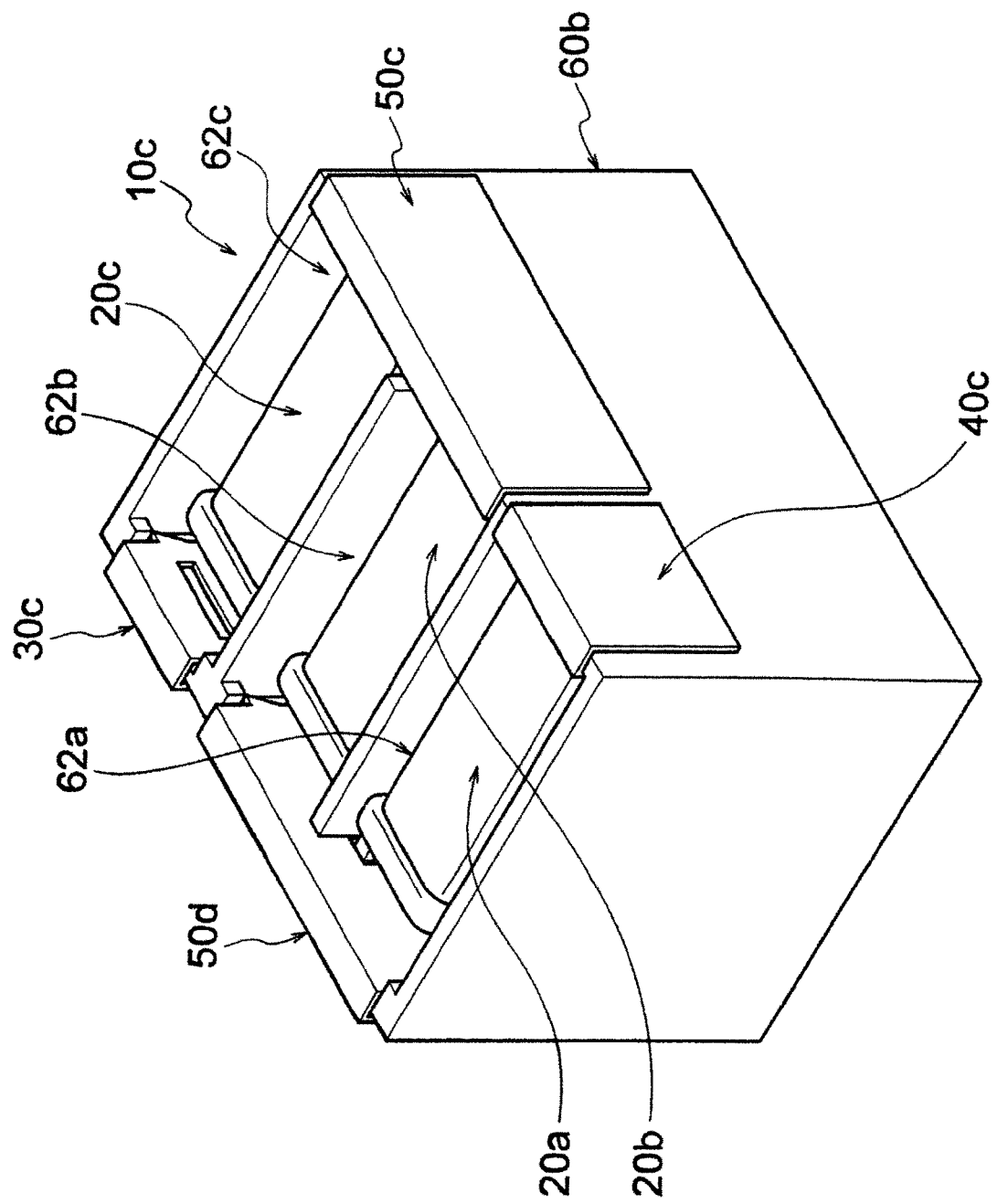
FIG. 12 is a schematic perspective view of the electronic device according to other embodiment of the invention.
Figure 13A:
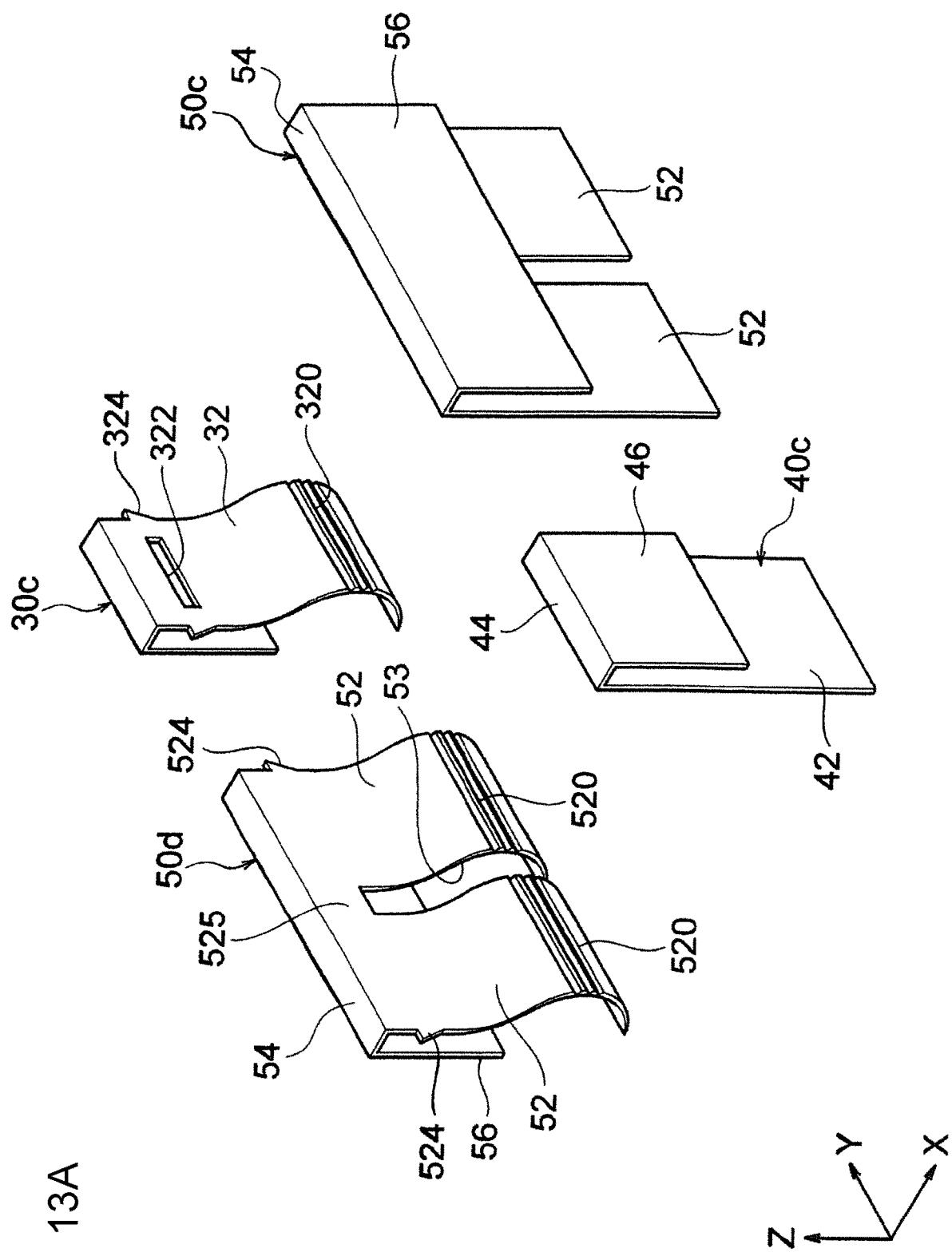
FIG. 13A is a schematic perspective view of the metal terminal shown in FIG. 12.
Figure 13B:
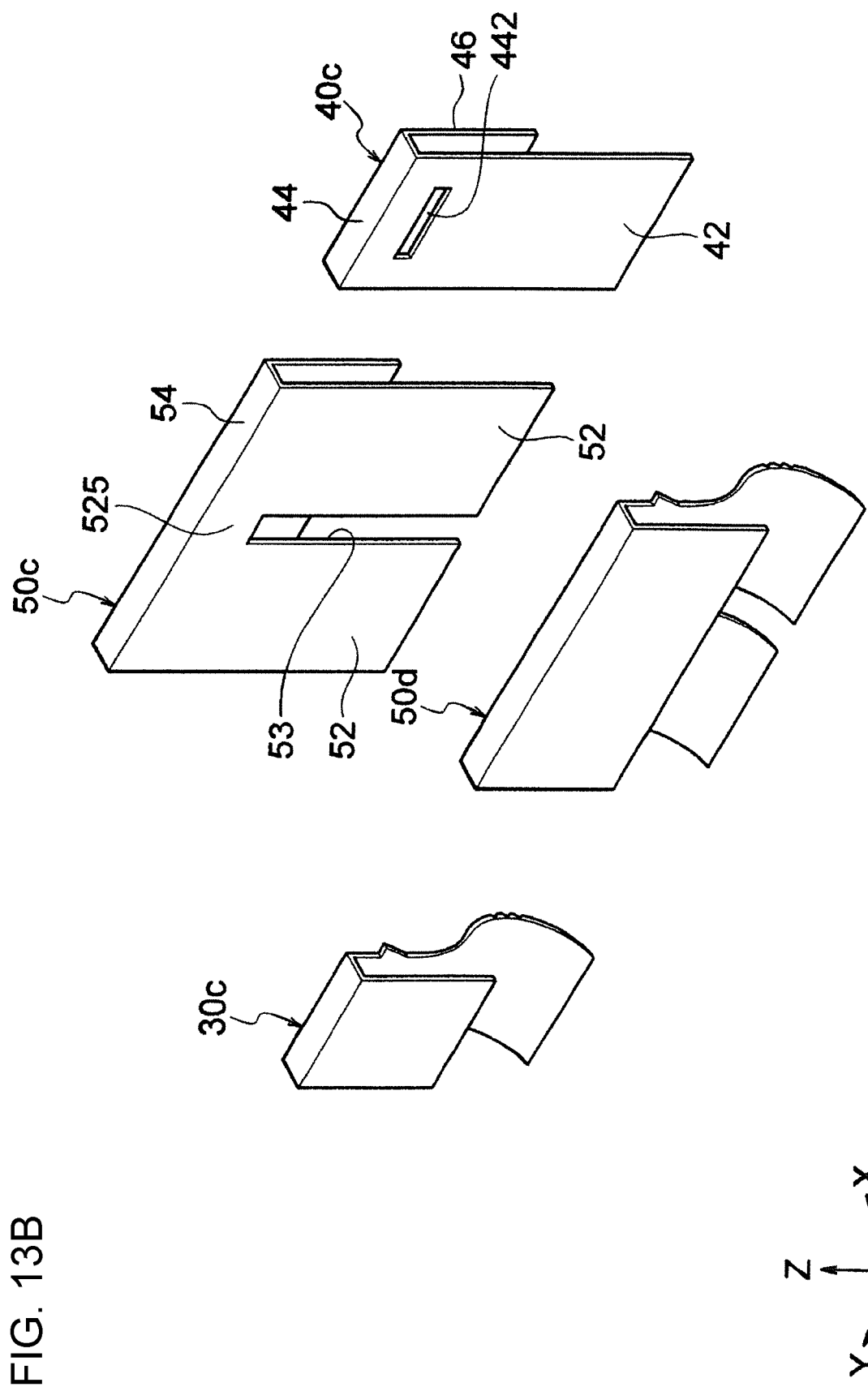
FIG. 13B is a schematic perspective view of the metal terminal shown in FIG. 13A viewed from a different angle.
Figure 13C:
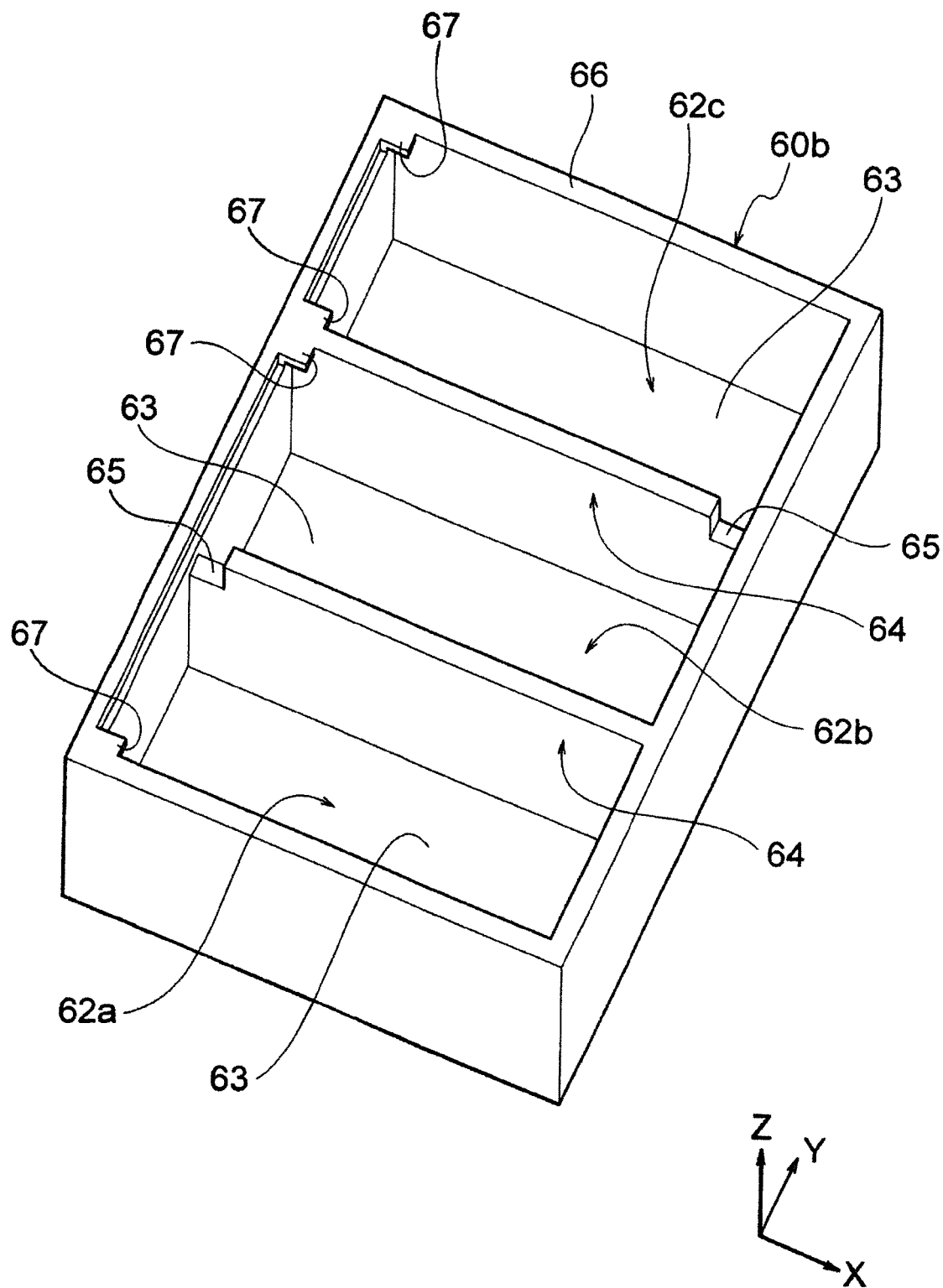
FIG. 13C is a schematic perspective view of the metal terminal shown in FIG. 13A viewed from a different angle.

The electronic device 10c according to the embodiment shown in FIGS. 12 to 13C has the same configuration as that of the electronic device 10, 10a, or 10b according to the above-described embodiments, except for the following points, and has the same configurations and effects. In FIGS. 12 to 13C, members that are the same as those in the electronic device 10, 10a, or 10b of the above-described embodiments are given the same reference numerals, and description thereof is partially omitted.

According to the electronic device 10c of the embodiment, as shown in FIG. 13C, the insulating case 60b has the accommodation recesses 62a to 62c separated by the partition walls 64. In each partition wall 64, communication grooves 65 are alternately formed along the X-axis direction. The groove depth in the Z-axis direction of each connecting groove 65 is equal to the groove depth of the connecting groove 65 of the third embodiment. The bottom wall 63 of each accommodation recesses 62a to 62c is formed separately for the each of the accommodation recesses 62a to 62c. Further, according to the embodiment, on one side in the X-axis direction of the insulating case 60b, the engaging protrusions 67 are respectively formed at the corners of the opening faces of the accommodation recesses 62a to 62c except for the place where the communication groove 65 is provided.

As shown in FIG. 12, according to the embodiment, two common metal terminals 50c and 50d and two individual metal terminals 30c and 40c are attached to the insulating case 60b. As shown in FIG. 13B, one common metal terminal 50c includes a pair of inner electrode parts 52. These are separated by a slit 53 extending in the Z-axis direction and are connected by a connecting piece 525 and an opening edge electrode part 54. Side electrode parts 56 are continuously formed to the opening edge electrode part 54. Each inner electrode part 52 is inserted into the inner wall face in the X-axis direction on the side where the communication groove 65 of the accommodation grooves 62b, 62c shown in FIG. 13C is formed, and the connecting piece 525 shown in FIG. 13B engage with the communication groove 65 shown in FIG. 13C.

The other common metal terminal 50d has a pair of inner electrode parts 52 as shown in FIG. 13A. These are separated by a slit 53 extending in the Z-axis direction and connected by a connecting piece 525 and an opening edge electrode part 54.

Side electrode parts 56 are continuously formed to the opening edge electrode part 54. Each inner electrode part 52 is inserted into the inner wall face in the X-axis direction on the side where the communication groove 65 of the accommodation grooves 62b, 62c shown in FIG. 13C is formed, and the connecting piece 525 shown in FIG. 13B engages with the communication groove 65 shown in FIG. 13C.

According to the embodiment, the engagement pieces 524 projecting outward along the width direction (the Y-axis direction) are provided on both sides of the inner electrode part 52 close to the opening edge electrode part 54. These engagement pieces 524 can be respectively engaged with the engagement parts 67, formed on the accommodation recesses 62a, 62b of the insulating case 60b shown in FIG. 13C. The engaging convex part 67 is preferably formed to be flush with the opening edge face 66.

Only by inserting the inner electrode parts 52, 52 of common metal terminal 50d shown in FIG. 13A into the insulating case 60b shown in FIG. 13C, the engagement pieces 524 and 524 are engaged with the engagement convex part 67 in a one-touch manner, and the terminals 50d can be easily positioned and firmly fixed to the insulating case 60b.

In the embodiment, as shown in FIG. 13A, the inner electrode parts 32, 52 are provided with curved part 320, 520 that are pressed by the spring force toward the capacitor chips 20a and 20b shown in FIG. 12. With this configuration, the inner side electrode parts 32 and 52 and one terminal electrode of capacitor chip 20a, 20b are connected by the pressure contact. At the same time, the other terminal electrodes of the capacitor chips 20a and 20b and the inner electrode part of the individual metal terminal 40c or the one inner electrode part of the common metal terminal 50c are connected in a pressure contact state. Therefore, it is not necessary to connect them with a connecting member such as solder or a conductive adhesive.

According to the embodiment, as shown in FIG. 13A, one individual metal terminal 30c includes inner electrode part 32, inserted along one inner wall in the X-axis direction of the accommodation recess 62c of the insulating case 60b shown in FIG. 13C. And as shown in FIG. 13B, the other individual metal terminal 40c includes inner electrode part 42, inserted along the other inner wall in the X-axis direction of the accommodation recess 62a of the insulating case 60b shown in FIG. 13C.

According to the embodiment, an elongated through hole 322(422) is formed close to the opening edge electrode part 34(44) in the inner electrode part 32(42) of the individual terminal electrode 30c, 40c along the width direction (the Y-axis direction).

By forming the through-holes 322, 422, when the opening edge electrode part 34, 44 is connected to such as the circuit board with such as solder, solder wicking toward the inner electrode part 32, 42 can be prevented by the through-holes 322, 422. That is, so-called solder bridge can be effectively prevented.

Further, according to the embodiment, the engagement pieces 324 projecting outward along the width direction (the Y-axis direction) may be provided on both sides of the inner electrode part 32 of one individual metal terminal 30c close to the opening edge electrode part 34(44). These engagement pieces 324 can be respectively engaged with the engagement parts 67, formed on both sides in the Y-axis direction of one inner wall face in the X-axis direction of the accommodation recess 62c of the insulating case 60b shown in FIG. 13C. The engaging convex part 67 is preferably formed to be flush with the opening edge face 66.

Only by inserting the inner electrode parts 32 of individual metal terminal 30c shown in FIG. 13A into the insulating case 60b shown in FIG. 13C, the engagement piece 324 is engaged with the engagement convex part 67 in a one-touch manner, and the terminals 30c can be easily positioned and firmly fixed to the insulating case 60b.

In the embodiment, as shown in FIG. 13A, the inner electrode part 32 is provided with curved part 320 that is pressed by the spring force toward the capacitor chip 20c shown in FIG. 12. With this configuration, the inner side electrode parts 32 and one terminal electrode of capacitor chip 20c shown in FIG. 12 are connected in the pressure contact state. At the same time, the other terminal electrodes of the capacitor chip 20c and the inner electrode part of the common metal terminal 50c are connected in a pressure contact state. Therefore, it is not necessary to connect them with a connecting member such as solder or a conductive adhesive.

According to the embodiment, the metal terminals 30c, 40c, 50c and the capacitor chips 20a to 20c can be connected in series without using solder. Thus, it becomes possible to use such as copper or copper alloy as the material of the terminals 30c, 40c, 50c, 50d, and ESR (Equivalent series resistance) can be reduced. Further, since no solder is used, it is possible to reduce the possibility of cracks and the like occurring in the capacitor chips 20a to 20c due to the difference in thermal expansion.

According to the embodiment, since the electronic device 10c has the individual metal terminals 30c and 40c and the common metal terminals 50c and 50d, three or more capacitor chips 20a to 20c can be easily connected in series by connecting at least the individual metal terminals 30c, 40c to the circuit board. By connecting three or more capacitor chips 20a to 20c in series, it is possible to increase the withstand voltage of the electronic device 10 and contribute to improving the safety of the electronic device on which the electronic device 10 is mounted.

Fifth Embodiment

Figure 14:
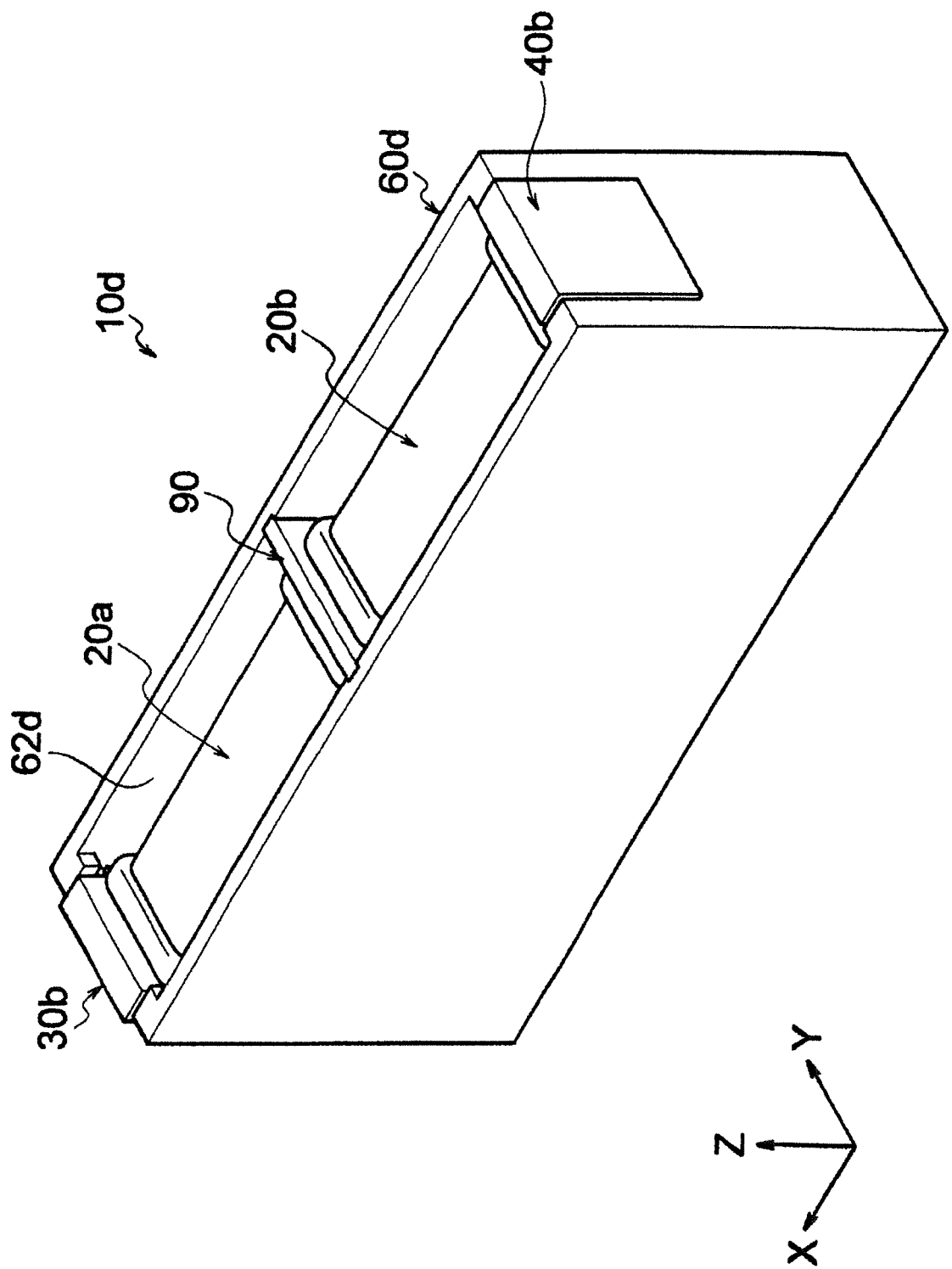
FIG. 14 is a schematic perspective view of an electronic device according to another embodiment of the invention.
Figure 15A:
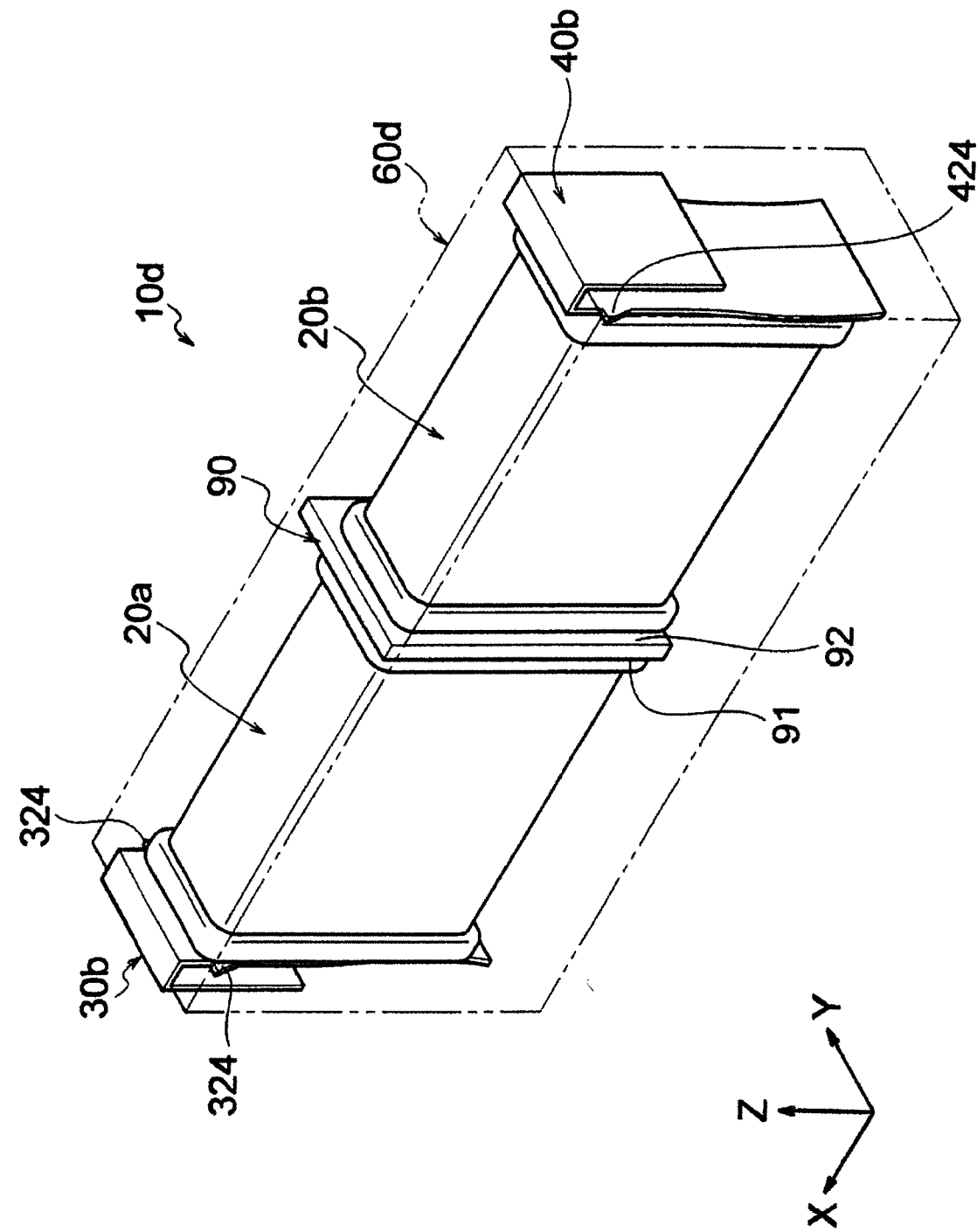
FIG. 15A is a schematic perspective view of the electronic device of FIG. 14 showing inside by the transparent case.
Figure 15B:
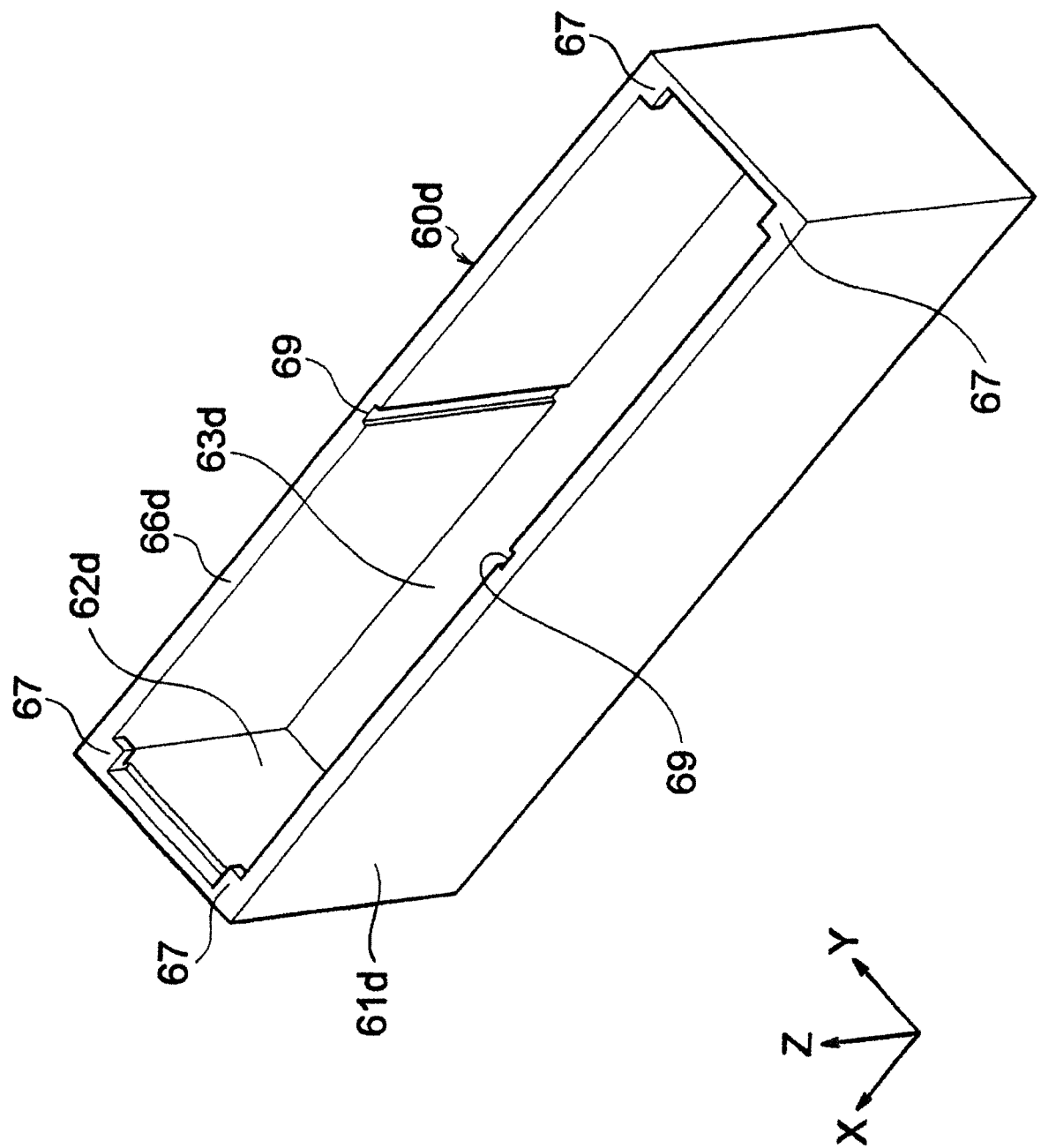
FIG. 15B is a schematic perspective view of the case shown in FIG. 14 viewed from a different angle.
Figure 16:
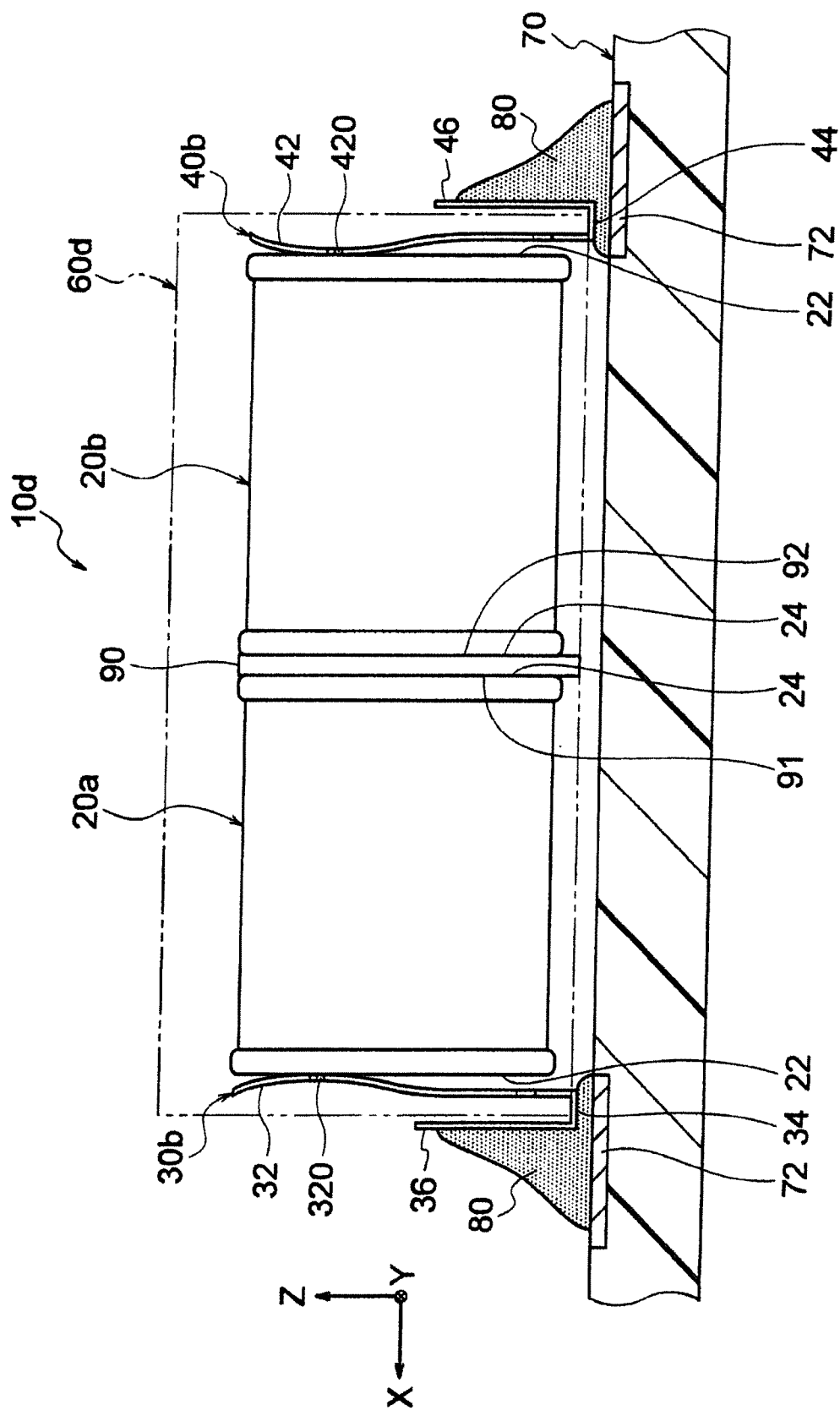
FIG. 16 is a partially transparent side view showing an example of a mounted state of the electronic device shown in FIG. 14.

The electronic device 10d according to the embodiment shown in FIGS. 14 to 16 has the same configuration as that of the electronic device 10, 10a, 10b, or 10c according to the above-described embodiments except for the following points, and has the same effects. In FIGS. 14 to 16, members that are the same as those in the electronic device 10, 10a, 10b, or 10c of the above-described embodiments are given the same reference numerals, and description thereof is partially omitted.

As shown in FIG. 14, the electronic device 10d of the embodiment includes an intermediate connector 90 and an insulating case 60d in addition to the capacitor chips 20a, 20b shown in such as FIG. 1 and the individual metal terminals 30b and 40b shown in such as FIG. 8D.

As shown in FIG. 15B, the insulating case 60d is configured by a rectangular parallelepiped casing elongated in the X-axis direction. The insulating case 60d includes outer wall 61d, accommodation recess 62d, a bottom wall 63d, an opening edge face 66d, and an engagement groove 69, in addition to the engagement protrusion 67 shown in FIG. 8B. The outer wall 61d, the bottom wall 63d, and the opening edge face 66d have shapes that are longer in the X-axis direction than the outer wall 61, the bottom wall 63, and the opening edge face 66 shown in FIG. 2B, respectively.

As shown in FIGS. 15A and 15B, the outer wall 61d is provided with individual metal terminals 30b, 40b. According to the embodiment, each of the pair of individual metal terminals 30b and 40b is disposed to face the X-axis direction (the longitudinal direction of the insulating case 60d).

The first individual metal terminal 30b is attached to a wall surface parallel to the Y-Z plane located on one end side of the outer wall 61d in the X-axis direction. The second individual metal terminal 40b is attached to a wall surface parallel to the Y-Z plane located on the other end side in the X-axis direction of the outer wall 61d. As shown in FIG. 16, the inner electrode parts 32, 42 of the individual metal terminals 30b, 40b are provided with curved part 320, 420, but the curved part 320, 420 are not essential and may be omitted.

As shown in FIG. 15B, according to the embodiment, the insulating case 60d is not provided with the partition part 64 shown in FIG. 2B. Therefore, unlike the insulating case 60 shown in FIG. 2B, the number of accommodation recess 62d in the insulating case 62d is only one. By inserting an intermediate connecting body 90 (described later) into the accommodation recess 62d, two accommodation spaces arranged along the X-axis direction are formed inside the accommodation recess 62d.

The shape of the accommodation recess 62d is elongated in the X-axis direction corresponding to the overall shape of the insulating case 60d. As shown in FIGS. 15A and 16, capacitor chips 20a and 20b are accommodated in the accommodation recess 62d.

According to the embodiment, the capacitor chips 20a, 20b are disposed between the first individual metal terminal 30b and the second individual metal terminal 40b with the end surfaces 21, 23 facing each other. That is, the capacitor chips 20a and 20b are arranged in series along the X-axis direction inside the accommodation recess 62d.

The size of the accommodation recess 62d is large enough to accommodate the capacitor chips 20a, 20b arranged in series. The width of the accommodation recess 62d in the X-axis direction (longitudinal direction) is larger than the sum of the widths of the capacitor chips 20a, 20b in the X-axis direction. Thus, while attaching the terminals 30b and 40b and the intermediate connector 50 to the insulating case 60, the terminal electrodes 22 and 24 of capacitor chips 20a and 20b are determined to be in pressure contact with the inner electrode parts 32 and 42 and the intermediate connector 50.

Engaging protrusions 67 are formed at the respective corners (four corners) of the opening face of the accommodation recess 62d. Engaging pieces 324, 424 of the individual metal terminals 30b, 40b shown in FIG. 15A are engaged (fixed) to respective engagement convex 67.

As shown in FIG. 15B, two engagement grooves 69 extending in the Z-axis direction are formed on the inner wall face (inner face) of the outer wall 61d. Each engagement groove 69 is formed inside a wall face parallel to the X-Z plane (wall face elongated in the X-axis direction) of the outer wall 61d, and is located in the middle of the wall face in the longitudinal direction (substantially at the center in the X-axis direction).

The engaging groove 69 is continuously formed from the upper end to the lower end of the outer wall 61d, and the width of the engaging groove 69 in the X-axis direction and the depth of the engaging groove 69 in the Y-axis direction can be fixed by inserting the intermediate connector 90. For example, the width of the engagement groove 69 in the X-axis direction is approximately the same as or larger than the plate thickness of the intermediate connector 90.

As shown in FIGS. 15A and 16, the intermediate connector 90 is formed of a rectangular plate having conductivity and is placed between each of the pair of individual metal terminals 30b, 40b. Intermediate connector 90 and a pair of individual metal terminals 30b, and 40b are arranged along the X-axis direction, and the capacitor chips 20a, 20b are arranged on both sides of the intermediate connector 90 in the X-axis direction.

The intermediate connector 90 connects the terminal electrodes 24, 24 of the adjacent capacitor chips 20a, 20b (arranged in series). That is, in the embodiment, the terminal electrodes 24, 24 of the capacitor chips 20a, 20b are indirectly connected via the intermediate connector 90. The intermediate connector 90 is inserted into the accommodation recess 62d through the engagement grooves 69.

The intermediate connector 90 includes the first connecting face 91 facing one side in the X-axis direction and the second connecting face 92 facing the other side in the X-axis direction. The connecting faces 91, 92 are surfaces facing the side electrode parts 36, 46 of the individual metal terminals 30b, 40b. The second terminal electrode 24 of the capacitor chip 20a is connected to the first connecting face 91, and the second terminal electrode 24 of the capacitor chip 20b is connected to the second connecting face 92. Each capacitor chip 20a, 20b is electrically connected via an intermediate connector 90.

The area of the intermediate connector 90 (connecting faces 91 and 92) is larger than the same of the terminal electrodes 22 and 24 of the capacitor chips 20a and 20b but is not particularly limited. If the electrical connection between each of the capacitor chips 20a, 20b can be confirmed, it may be smaller than the illustrated example, and the shape of the intermediate connector 90 may be, for example, a square, a circle, a triangle, or the other shapes.

The capacitor chip 20a is placed in the space between the first individual metal terminal 30b and the intermediate connector 90. The capacitor chip 20a then receives the spring force from the curved part 320 of the first individual metal terminal 30b when sandwiched between the first individual metal terminal 30b and the intermediate connector 90.

The capacitor chip 20b is placed in the space between the second individual metal terminal 40b and the intermediate connector 90. The capacitor chip 20b then receives the spring force from the curved part 420 of the second individual metal terminal 40b when sandwiched between the second individual metal terminal 40b and the intermediate connector 90.

As shown in FIG. 16, the electronic device 10d is mounted on the individual circuit patterns 72 and 72 of the circuit board (external circuit) 70 in a state where the electronic device 10d shown in FIG. 14 is turned upside down. That is, the mounting face of the electronic device 10d is the opening face side of the accommodation recess 62d shown in FIG. 15B. The electronic device 10d is mounted on a circuit board (external circuit) 70 by connecting the individual metal terminals 30, 40 (opening edge electrode parts 34, 44 and side electrode parts 36, 46) and the individual circuit patterns 72, 72 with such as solder 80 or a conductive adhesive.

Solder fillets are formed between the side electrode parts 36, 46 and the individual circuit patterns 72, 72, so that the electronic device 10d can be firmly fixed to the circuit board (external circuit) 70.

As shown in FIG. 16, the electronic device 10d of the embodiment includes a pair of individual conductive terminals 30b, 40b that are placed to face each other. Two capacitor chips 20a, 20b are interposed between the pair of individual conductive terminals 30b, 40b, arranged with the end faces 24, 24 facing each other. Therefore, two capacitor chips 20a, 20b can be arranged in series inside the accommodation recess 62d. And two terminal electrodes 24, 24 of the capacitor chips 20a, 20b are connected to each other, and electronic device 10d in which two capacitor chips 20a, 20b connected in series can be configured.

Further, since the electronic device 10d has an elongated shape in the X-axis direction, the electronic device 10d can be mounted in a narrow (thin) space of the circuit board (external circuit) 70.

According to the embodiment, the terminal electrodes 24, 24 of adjacent capacitor chips 20a, 20b can be easily connected to each other via intermediate connector 90.

The invention is not limited to the above-described embodiments and can be variously modified within the scope of the invention.

For example, in each of the embodiments described above, the capacitor chip is illustrated as an example of the chip component, but a chip component other than the capacitor chip may be used.

In each of the above embodiments, the number of capacitor chips included in the electronic device 10 is not limited to two or three. The number is not limited as long as it is a plural number.

In this case, according to the fifth embodiment, the number of intermediate connectors 90 is appropriately determined according to the number of capacitor chips included in the electronic device 10d. For instance, the number of intermediate connectors 90 becomes two when the number of capacitor chips is three, and each of the three capacitor chips is connected in series via each of the two intermediate connectors 90.

Furthermore, according to the above embodiment, only the inner electrode parts 32, 42, 52 inserted into the inner wall face on one side in the X-axis direction of each accommodation recesses 62a to 62c are provided with the curved part 320, 420, 520, however, the invention is not limited thereof. For example, the curved part 320, 420, and 520 may be formed on both inner electrode parts 32, 42, and 52 that are inserted into the inner wall faces on both sides in the X-axis direction of the respective accommodation recesses 62a to 62c.

Moreover, according to each embodiments described above, although the partition wall 64 made a part of insulation case 60, 60a, 60b, a separate partition wall member (member which has a function similar to the partition wall 64) is prepared, and this may be provided at a position corresponding to the partition wall 64 of the insulating cases 60, 60a, 60b. That is, the insulating partition wall may be configured separately from the insulating case.

According to the fifth embodiment, the intermediate connector 90 is not essential. For example, the intermediate connector 90 may be omitted, and the terminal electrodes 24, 24 of the capacitor chips 20a, 20b may be directly connected inside the accommodation recess 62d. Alternatively, the terminal electrodes 24, 24 of the capacitor chips 20a, 20b may be connected using such as a conductive adhesive.

EXPLANATION OF REFERENCES 10, 10a to 10d . . . Electronic device
20a to 20c . . . Capacitor chip
21, 23 . . . End face
22, 24 . . . Terminal electrode
26 . . . Inner electrode layer
28 . . . Dielectric layer
30, 30a to 30c . . . The first individual metal terminal (Individual conductive terminal)
32 . . . Inner electrode part
   320 . . . Curved part
   322 . . . Through hole
   324 . . . Engagement piece
34 . . . Opening edge electrode part
36 . . . Side electrode part
38 . . . Anti-opening electrode part
40, 40a to 40c . . . The second individual metal terminal (Individual conductive terminal)
42 . . . Inner electrode part
   420 . . . Curved part
   422 . . . Through hole
   424 . . . Engagement piece
44 . . . Opening edge electrode part
46 . . . Side electrode part
48 . . . Anti-opening electrode part
50, 50a to 50d . . . Common metal terminal (common conductive terminal)
52 . . . Inner electrode part
   520 . . . Curved part
   524 . . . Engagement piece
   525 . . . Connecting piece
53 . . . Slit
54 . . . Opening edge electrode part
56 . . . Side electrode part
58 . . . Anti-opening electrode part
60, 60a, 60b, 60d . . . Insulation case
   61, 61d . . . Outer wall
   62a, 62b, 62d . . . accommodation recess
   63, 63d . . . Bottom wall
   64 . . . Partition wall
   65 . . . Connecting groove
   66, 66d . . . Opening edge face
   67 . . . Engagement convex
   68 . . . Anti-opening surface (bottom surface)
70 . . . Circuit board
72, 72a . . . Individual circuit pattern
74 . . . Common circuit pattern
80 . . . Solder
90 . . . Intermediate connector
   91 . . . The first connecting face
   92 . . . The second connecting face

What is claimed is:

1. An electronic device comprising:
a first chip component having a first terminal electrode and a second terminal electrode formed on both end faces,
a second chip component having a first terminal electrode and a second terminal electrode formed on both end faces,
a case provided with an accommodation recess in which at least the first chip component and the second chip component are accommodated, and an opening edge face formed around an opening face of the accommodation recess,
an individual conductive terminal comprising an inner electrode part inserted along an inner side wall of the accommodation recess in the case and being connected to the first terminal electrode of the first chip component or the second chip component, an opening edge electrode part formed over the opening edge face to be continuous to the inner electrode part, and a side electrode part formed along the outer side face of the case to be continuous to the opening edge electrode part, and
a common conductive terminal having an inner electrode part inserted along the inner side wall of the accommodation recess of the case and being connected to the second terminal electrode of the first chip component and the second terminal electrode of the second chip component adjacent to each other inside the accommodation recess.

2. The electronic device according to claim 1, wherein the individual conductive terminal further comprising;
an anti-opening electrode part formed to be continuous to the side electrode part on an anti-opening surface located on the opposite side of the opening edge face.

3. The electronic device according to claim 1, wherein the inner electrode part of the individual conductive terminal comprises a curved part to be pressed against the first terminal electrode of the first chip component or the second chip component by a spring force.

4. The electronic device according to claim 2, wherein the inner electrode part of the individual conductive terminal comprises a curved part to be pressed against the first terminal electrode of the first chip component or the second chip component by a spring force.

5. The electronic device according to claim 1, wherein a through-hole is formed along the width direction on the inner electrode part of the individual conductive terminal at a side close to the opening edge face.

6. The electronic device according to claim 2, wherein a through-hole is formed along the width direction on the inner electrode part of the individual conductive terminal at a side close to the opening edge face.

7. The electronic device according to claim 1, wherein
an engagement piece is formed to project outward along the width direction on the inner electrode part of the individual conductive terminal at a side close to the opening edge face, and
an engagement convex engaging the engagement piece is formed on the opening edge face.

8. The electronic device according to claim 1, wherein a surface of the inner electrode part of the individual conductive terminal is subjected to a solder adhesion preventing process.

9. The electronic device according to claim 1, wherein the accommodation recess is provided with a partition wall partitioning the first chip component and the second chip component adjacent to each other.

10. The electronic device according to claim 1 wherein the common conductive terminal further comprises
an opening edge electrode part formed over the opening edge face to be continuous to the inner electrode part of the common conductive terminal on the side opposite to the individual conductive terminal and a side electrode part formed along the outer side face of the case to be continuous to the opening edge electrode part on the side opposite to the individual conductive terminal.

11. The electronic device according to claim 2 wherein the common conductive terminal further comprises
an opening edge electrode part formed over the opening edge face to be continuous to the inner electrode part of the common conductive terminal on the side opposite to the individual conductive terminal and
a side electrode part formed along the outer side face of the case to be continuous to the opening edge electrode part on the side opposite to the individual conductive terminal.

12. The electronic device according to claim 10 wherein the common conductive terminal further comprises;
an anti-opening electrode part formed to be continuous to the side electrode part of the common conductive terminal on an anti-opening surface located on the opposite side of the opening edge face.

13. The electronic device according to claim 11 wherein the common conductive terminal further comprises;
an anti-opening electrode part formed to be continuous to the side electrode part of the common conductive terminal on an anti-opening surface located on the opposite side of the opening edge face.

14. The electronic device according to claim 1, wherein the inner electrode part of the common conductive terminal comprises a curved part pressed against the second terminal electrode of the first chip component or the second chip component by a spring force.

15. The electronic device according to claim 1, wherein the accommodation recess is provided with a partition wall partitioning the first chip component and the second chip component adjacent to each other, and
a connecting groove is formed on the partition wall to connect the inner electrode part of the common conductive terminal.

16. The electronic device according to claim 1, wherein the accommodation recess is filled with a resin.

17. The electronic device according to claim 1, wherein the inner electrode part of the individual conductive terminal and the inner electrode part of the common conductive terminal are inserted along an inner side wall of the accommodation recess in the case from the opening face of the accommodation recess toward an opposite side of the opening face.

18. The electronic device according to claim 1, wherein the individual conductive terminal comprises a first individual conductive terminal configured to be connected to the first chip component and a second individual conductive terminal configured to be connected to the second chip component,
the side electrode part comprises a first side electrode part of the first individual conductive terminal and a second side electrode part of the second individual conductive terminal, and
the first side electrode part and the second side electrode part are located on a same outer surface of the case.

19. The electronic device according to claim 18 wherein the first side electrode part and the second side electrode part are located on the same outer surface of the case on the side opposite to the opening edge face of the case.

20. The electronic device according to claim 18 wherein the common conductive terminal further comprises
an opening edge electrode part formed over the opening edge face to be continuous to the inner electrode part of the common conductive terminal on the side opposite to the individual conductive terminal and
a side electrode part formed along the outer side face of the case to be continuous to the opening edge electrode part on the side opposite to the individual conductive terminal, wherein
the first side electrode part of the first individual conductive terminal, the second side electrode part of the second individual conductive terminal and the side electrode part of the common conductive terminal are located on the same outer surface of the case on the side opposite to the opening edge face of the case.

21. An electronic device comprising:
a first chip component having a first terminal electrode and a second terminal electrode formed on both end faces,
a second chip component having a first terminal electrode and a second terminal electrode formed on both end faces,
a case provided with an accommodation recess in which at least the first chip component and the second chip component are accommodated, and an opening edge face formed around an opening face of the accommodation recess,
a first individual conductive terminal comprising a first inner electrode part inserted along an inner side wall of the accommodation recess in the case and being connected to the first terminal electrode of the first chip component, a first opening edge electrode part formed over the opening edge face to be continuous to the first inner electrode part, and a first side electrode part formed along the outer side face of the case to be continuous to the first opening edge electrode part,
a second individual conductive terminal comprising a second inner electrode part inserted along the inner side wall of the accommodation recess in the case and being connected to the first terminal electrode of the second chip component, a second opening edge electrode part formed over the opening edge face to be continuous to the second inner electrode part, and a second side electrode part formed along the outer side face of the case to be continuous to the second opening edge electrode part, and
an intermediate connector comprising a first connection surface to which the second terminal electrode of the first chip component is connected and a second connection surface opposite the first connection surface to which the second terminal electrode of the second chip component is connected, wherein
the first individual conductive terminal and the second individual conductive terminal are disposed facing each other in a first direction,
the first chip component and the second chip component are arranged side by side in the first direction between the first individual conductive terminal and the second individual conductive terminal,
the second terminal electrode of the first chip component and the second terminal electrode of the second chip component face each other along the first direction.

22. The electronic device according to claim 21, wherein the intermediate connector is inserted along the inner side wall of the accommodation recess.

23. The electronic device according to claim 22, wherein engagement grooves into which the intermediate connector is inserted are formed on the inner side wall of the case.

24. An electronic device comprising:
a first chip component having a first terminal electrode and a second terminal electrode formed on both end faces,
a second chip component having a first terminal electrode and a second terminal electrode formed on both end faces,
a case provided with an accommodation recess in which at least the first chip component and the second chip component are accommodated, and an opening edge face formed around an opening face of the accommodation recess,
an individual conductive terminal comprising an inner electrode part inserted along an inner side wall of the accommodation recess in the case and being connected to the first terminal electrode of the first chip component or the second chip component, an opening edge electrode part formed over the opening edge face to be continuous to the inner electrode part, and a side electrode part formed along the outer side face of the case to be continuous to the opening edge electrode part, and
a common conductive terminal having an inner electrode part inserted along the inner side wall of the accommodation recess of the case to connect the second terminal electrode of the first chip component and the second terminal electrode of the second chip component adjacent to each other inside the accommodation recess, wherein
the accommodation recess is provided with a partition wall partitioning the first chip component and the second chip component adjacent to each other, and
a connecting groove is formed on the partition wall to connect the inner electrode part of the common conductive terminal.

25. An electronic device comprising;
a first chip component having a first terminal electrode and a second terminal electrode formed on both end faces,
a second chip component having a first terminal electrode and a second terminal electrode formed on both end faces,
a case provided with an accommodation recess in which at least the first chip component and the second chip component are accommodated, and an opening edge face formed around an opening face of the accommodation recess,
an individual conductive terminal comprising an inner electrode part inserted along an inner side wall of the accommodation recess in the case and being connected to the first terminal electrode of the first chip component or the second chip component, an opening edge electrode part formed over the opening edge face to be continuous to the inner electrode part, and a side electrode part formed along the outer side face of the case to be continuous to the opening edge electrode part, and
a common conductive terminal having an inner electrode part inserted along the inner side wall of the accommodation recess of the case and being connected to the second terminal electrode of the first chip component and the second terminal electrode of the second chip component adjacent to each other inside the accommodation recess and an opening edge electrode part formed over the opening edge face to be continuous to the inner electrode part of the common conductive terminal on the side opposite to the individual conductive terminal, wherein
the accommodation recess is provided with a partition wall partitioning the first chip component and the second chip component adjacent to each other, and the opening edge electrode part of the common conductive terminal continuously extends from a region on one side of the partition wall to a region on the other side of the partition wall along the opening edge face.

* * * * *